United States Patent
Ward et al.

(10) Patent No.: US 11,112,952 B2
(45) Date of Patent: Sep. 7, 2021

(54) INTERFACE FOR DISPLAY OF MULTI-LAYER IMAGES IN DIGITAL MICROSCOPY

(71) Applicant: Microscopes International, LLC, Plano, TX (US)

(72) Inventors: Jonathan C. Ward, Plano, TX (US); Richard K. Rainbolt, Allen, TX (US)

(73) Assignee: Microscopes International, LLC, Plano, TX (US)

( * ) Notice: Subject to any disclaimer, the term of this patent is extended or adjusted under 35 U.S.C. 154(b) by 0 days.

(21) Appl. No.: 16/365,574

(22) Filed: Mar. 26, 2019

(65) Prior Publication Data

US 2019/0294317 A1 Sep. 26, 2019

Related U.S. Application Data

(60) Provisional application No. 62/648,331, filed on Mar. 26, 2018.

(51) Int. Cl.
*G06F 3/0484* (2013.01)
*G02B 21/36* (2006.01)
*G02B 21/26* (2006.01)

(52) U.S. Cl.
CPC ....... *G06F 3/04842* (2013.01); *G02B 21/367* (2013.01); *G02B 21/368* (2013.01); *G06F 3/04847* (2013.01); *G02B 21/26* (2013.01); *G06F 2203/04806* (2013.01)

(58) Field of Classification Search
CPC ....... G06F 3/04842; G06F 2203/04806; G02B 21/365; G02B 21/367
See application file for complete search history.

(56) References Cited

U.S. PATENT DOCUMENTS

| | | | |
|---|---|---|---|
| 4,066,356 A | 1/1978 | Parker | |
| 4,279,173 A | 7/1981 | Krebs et al. | |
| 5,025,676 A | 6/1991 | Perretta | |
| 5,471,515 A | 11/1995 | Fossum et al. | |
| 5,540,112 A | 7/1996 | Baker et al. | |
| 5,841,126 A | 11/1998 | Fossum et al. | |
| 6,005,619 A | 12/1999 | Fossum | |
| 6,101,265 A | 8/2000 | Bacus et al. | |
| 6,226,392 B1 | 5/2001 | Bacus et al. | |
| 6,272,235 B1 | 8/2001 | Bacus et al. | |
| 6,396,941 B1 | 5/2002 | Bacus et al. | |
| 6,466,690 B2 | 10/2002 | Bacus et al. | |
| 6,522,774 B1 | 2/2003 | Bacus et al. | |

(Continued)

OTHER PUBLICATIONS

"acdsee pro Photo Manager—User Guide," published before Feb. 5, 2006 (as indicated by Internet Archive Wayback Machine), published by ACD Systems, available online at http://files.acdsystems.com/english/acdseepro/manuals/acdseepro-userguide.pdf, pp. 8-9, 11, 45-48, 56-59, 172-173, 260-263. (Year: 2006).*

(Continued)

*Primary Examiner* — Dino Kujundzic
(74) *Attorney, Agent, or Firm* — Timothy L. Scott

(57) ABSTRACT

A user interface for display of multiview image sets captured by slide scanning digital microscopes, including a graphical user interface (GUI) for the display of one or more of multi-level, multi-angle, and multi-region images.

20 Claims, 14 Drawing Sheets
(14 of 14 Drawing Sheet(s) Filed in Color)

(56) References Cited

U.S. PATENT DOCUMENTS

| | | | |
|---|---|---|---|
| 6,636,354 B1* | 10/2003 | D'Hooge | G02B 21/06 |
| | | | 359/368 |
| 6,674,881 B2 | 1/2004 | Bacus et al. | |
| 6,674,884 B2 | 1/2004 | Bacus et al. | |
| 6,711,283 B1 | 3/2004 | Soenksen | |
| 6,775,402 B2 | 8/2004 | Bacus et al. | |
| 6,917,696 B2 | 7/2005 | Soenksen | |
| 7,031,507 B2 | 4/2006 | Bacus et al. | |
| 7,035,478 B2 | 4/2006 | Crandall et al. | |
| 7,110,586 B2 | 9/2006 | Bacus et al. | |
| 7,116,440 B2 | 10/2006 | Eichhorn et al. | |
| 7,149,332 B2 | 12/2006 | Bacus et al. | |
| 7,234,114 B2* | 6/2007 | Kurtz | G06F 8/38 |
| | | | 715/746 |
| 7,235,047 B2 | 6/2007 | MacAulay et al. | |
| 7,257,268 B2 | 8/2007 | Eichhorn et al. | |
| 7,428,324 B2 | 9/2008 | Crandall et al. | |
| 7,457,446 B2 | 11/2008 | Soenksen | |
| 7,706,060 B2 | 4/2010 | Mogami et al. | |
| 7,755,832 B2 | 7/2010 | MacAulay et al. | |
| 7,813,579 B2 | 10/2010 | Oshiro et al. | |
| 7,978,894 B2 | 7/2011 | Soenksen | |
| 8,027,548 B2 | 9/2011 | Oshiro et al. | |
| 8,055,042 B2 | 11/2011 | Soenksen | |
| 8,114,625 B2 | 2/2012 | Bocking et al. | |
| 8,184,920 B2 | 5/2012 | Oshiro et al. | |
| 8,385,619 B2 | 2/2013 | Soenksen | |
| 8,664,002 B2 | 3/2014 | Yeung | |
| 8,668,640 B2 | 3/2014 | MacAulay et al. | |
| 8,755,579 B2 | 6/2014 | Soenksen | |
| 9,386,211 B2 | 7/2016 | Soenksen | |
| 10,119,901 B2 | 11/2018 | Casas | |
| 10,558,029 B2* | 2/2020 | Leshem | G16H 30/40 |
| 2003/0179445 A1 | 9/2003 | Casas | |
| 2004/0004614 A1* | 1/2004 | Bacus | G06T 3/40 |
| | | | 345/419 |
| 2005/0270370 A1* | 12/2005 | Uemura | G02B 21/36 |
| | | | 348/79 |
| 2010/0201800 A1* | 8/2010 | Yamamoto | G01J 3/02 |
| | | | 348/79 |
| 2011/0090223 A1* | 4/2011 | Eichhorn | H04N 13/395 |
| | | | 345/422 |
| 2011/0181622 A1* | 7/2011 | Bacus | G06T 3/00 |
| | | | 345/634 |
| 2014/0015933 A1* | 1/2014 | Sato | G02B 21/365 |
| | | | 348/46 |
| 2015/0248223 A1* | 9/2015 | Krupnik | G06T 3/4038 |
| | | | 715/838 |
| 2015/0310652 A1* | 10/2015 | Dobson | G02B 21/365 |
| | | | 345/629 |
| 2016/0299057 A1 | 10/2016 | Casas | |
| 2017/0061601 A1* | 3/2017 | Bryll | G02B 3/0081 |
| 2018/0356621 A1 | 12/2018 | Ward et al. | |
| 2019/0072751 A1 | 3/2019 | Rainbolt et al. | |
| 2019/0295219 A1* | 9/2019 | Sasaki | G02B 21/365 |
| 2020/0041780 A1* | 2/2020 | Na'aman | G02B 21/008 |
| 2020/0183127 A1* | 6/2020 | Usui | G02B 7/28 |

OTHER PUBLICATIONS

Ekanayake, Virantha, "Detecting Color Vs. Greyscale and Blank Pages During Scanning," available at https://virantha.com/2014/03/30/images-color-and-blank-detection/, Virantha.com, Mar. 30, 2014.

Kayser, K. et al., "From Telepathology to Virtual Pathology Institution: The New World of Digital Pathology," Romanian Journal of Morphology and Embryology, vol. 45, Nov. 1998, pp. 3-9, Germany.

Rojo, M. et al., "Critical Comparison of 31 Commercially Available Digital Slide Systems in Pathology," International Journal of Surgical Pathology, vol. 14, No. 4, Oct. 2006, pp. 285-305.

"Detecting Blank Image Files," available at https://superuser.com/questions/343385/detecting-blank-image-files, Stack Exchange Network, Oct. 5, 2011, Dec. 3, 2013, Feb. 22, 2015, Apr. 8, 2015, Oct. 9, 2017.

Office Action dated Jan. 10, 2019, U.S. Appl. No. 15/616,922, filed Jun. 8, 2017, 10 pages.

* cited by examiner

INTERFACE FOR DISPLAY OF MULTI-LAYER IMAGES IN DIGITAL MICROSCOPY

CROSS REFERENCE TO RELATED APPLICATIONS

This application claims the priority benefit of U.S. Provisional Application Ser. No. 62/648,331 filed Mar. 26, 2018, which is hereby incorporated herein by reference in its entirety.

BACKGROUND OF THE INVENTION

The present disclosure relates to the field of digital microscopes, and more specifically to a user interface for display of multiview image sets captured by slide scanning digital microscopes. The user interface may be a graphical user interface (GUI), and the multi-view image sets to be displayed may comprise one or more of multi-level, multi-angle, and multi-region images. The invention also relates to methods for determining multi-view image sets for display by the user interface.

The use of conventional optical microscopes with multiple objective lenses is limited because the user's field of view (FOV)—the portion of the specimen visible through the objective lens at the eyepiece—becomes smaller as magnification increases. When a user identifies a target area at low magnification and switches objective lenses to view it at higher magnification, the user may have difficulty in reacquiring the target area at the higher magnification because the FOV at the higher magnification is significantly smaller than at lower magnification. This problem is aggravated by the absence of a cross-reference for the target between the lower and higher magnifications.

The emergence of whole slide imaging (WSI) microscopes, which are automated or semi-automated microscopes using a combination of optical and electronic image acquisition and processing techniques to digitally scan or capture images, has not only helped overcome the FOV problem of conventional multi-objective microscopes discussed above, but has also allowed the capture, storage, and automated processing of microscope slide images in a more rapid and thorough manner.

WSI microscopes are automated microscopes that use a camera with a digital image sensor (DIS) to capture magnified images that may be viewed on a computer monitor or screen. An objective lens optically coupled to the camera provides magnification (e.g., 4×, 10×, 20×, 40×, 60×, or 80×) of the specimen on the microscope slide. A movable stage holding the microscope slide allows the specimen to be moved in a pattern of rows and/or columns, and images may be captured of all or part of the slide. WSI microscopes also include an illuminator having a light source to illuminate the slide specimen, and illuminator optics to direct the light through the specimen and into the objective lens. A computer, which may be coupled to the WSI microscope or included as part of a WSI microscope system, is used to control the operation of the WSI microscope system, including the acquisition of digital images. WSI microscopes typically lack the ocular or eyepiece lens in a standard compound microscope, and magnification of the slide specimen is usually provided by a single objective lens (which may include a relay lens for infinity-focused objectives) in optical communication with the DIS.

WSI microscopes allow a user to deal with the FOV problem of conventional microscopes by providing a digital cross-reference between the "instantaneous" FOV of the objective lens at any time and an overview image (e.g., a small or "thumbnail" image) of the entire slide specimen. The cross-reference may be visually indicated by, e.g., digital cross-hairs, a highlighted box, or other visual signal indicating the where the current view through the objective lens view is located within the overall image (e.g., the overview image). Because of the cross-reference, the user is always aware of the instantaneous objective lens FOV position within the overall slide specimen. More importantly, WSI microscopes allow the user to capture and view a relatively large target area or region of interest (ROI) at high magnification in its entirety, and to manipulate the image on a viewscreen (e.g., using a mouse or other device) to "scroll" through the image to any desired location. And like the instantaneous view of the objective lens, the ROI is also cross-referenced to show the user at a glance its location within the overall slide specimen.

WSI microscopes typically provide the overview image of the entire specimen area of the slide at low (or zero) magnification in an overview image window on a computer screen. The overview image may be taken by an overview camera at low or zero optical magnification and displayed as a thumbnail image in the overview window. The digital cross-reference of the instantaneous objective lens FOV to the overview image is obtained by calibration during the manufacturing process.

WSI microscopes allow a user to obtain a high-resolution, single image of a target area or region of interest (ROI) in a microscope slide specimen that is much larger (tens, hundreds, or thousands of times the area of a single objective lens FOV). Although there are significant variations among commercially available systems, WSI microscopes typically include a movable stage that holds the microscope slide and a motor to move the stage. In one type of WSI architecture, to generate an ROI image at high magnification the user designates the target area on the overview image using, e.g., a mouse or touchscreen, and then instructs the WSI microscope to scan the ROI from a series of fixed positions and create a corresponding series of smaller, overlapping digital images of adjacent Fields of View (each of which is usually referred to as a "field image" or "tile") that together completely cover the target area (ROI). Systems with this architecture are referred to herein as fixed image acquisition (FIA) systems, because the field images are obtained with the stage in a fixed (i.e., stationary) position. The overlapping field images are acquired by the digital camera as the movable stage moves the target area across the objective lens in a grid pattern.

Software then uses the overlapping edge areas of adjacent field images scanned by the digital camera to digitally combine the individual FOV images/tiles into a single high-magnification image (referred to herein as a "deep zoom" image) of the target/ROI area, which the user may then view within a window of a computer screen (e.g., by scrolling or standard computer window manipulations). Software may also be used to create an artificial "zoom in/zoom out" ability when viewing the deep zoom image of the ROI using known image processing algorithms to create a series of images at various lesser magnifications from the fully magnified deep zoom ROI image. The algorithms digitally reduce the detail level in the fully magnified ROI, but enable the user to "zoom out" (e.g., using a mouse or keyboard) to see a larger portion of the entire slide, up to and including the entire specimen area.

Additional details on the construction and operation WSI microscopes are described in, e.g., U.S. Pat. Nos. 6,101,265, 6,711,283, U.S. patent application Ser. No. 15/616,922 ("Systems and Methods for Rapid Scanning of Images in Digital Microscopes") filed Jun. 8, 2017, and U.S. patent application Ser. No. 15/694,990 ("Systems and Methods for Detection of Blank Fields in Digital Microscopes") filed Sep. 4, 2017, each of which is hereby incorporated by reference in its entirety. Compact WSI microscopes at various magnifications and having various features are available from Microscopes International, LLC (Plano, Tex.), including the uScope MXII, uScope HXII, uScope DXII, and uScope GXII.

In an alternative architecture from FIA systems, the slide stage is moved at a constant speed in a series of rows similar to a computer printer, and a line scanning camera is synchronized with the speed of the moving slide stage to sequentially capture individual lines of pixel data values as the slide stage moves the specimen across the line scanning camera. The lines of pixel data are then assembled into the single deep-zoom image of the ROI. Because line scanning cameras capture images while the stage (and specimen) are moving, they are typically faster than cameras capturing filed images/tiles, but are more expensive. These WSI systems are referred to herein as moving image acquisition (MIA) systems. In both MIA and FIA systems, one or more motors are typically provided to move the stage in and out (X axis) and left and right (Y axis).

WSI microscopes also include an illumination system providing light to the slide stage, and an objective lens to magnify the light from the slide specimen and focus it on a digital image sensor (DIS) element in a digital camera. Focusing is typically provided by making one or more of the microscope stage and the camera/objective lens structure (the camera and objective lens in WSI microscopes are typically coupled to a tube to maintain a fixed distance therebetween) movable by a motor (Z axis) capable of finely controlled, small movements on an axis generally perpendicular to the slide stage. This allows structures at different depths within the specimen to be captured in proper focus.

Digital image sensor cameras for WSI microscopes typically involve a CCD (charge coupled device) or a CMOS (complementary metal oxide semiconductor) image sensor as the DIS element. Recent trends in digital photography, particularly digital video cameras, have seen a migration toward CMOS digital image sensors, which are more cost-effective than CCD sensors. In some WSI systems, the DIS is incorporated into a static (snapshot) camera that captures field/tile images and combines them into a single, high-definition ROI image. In other systems, the DIS is incorporated into a video camera that outputs a stream of video images as video frames, which may be captured as still image fields/tiles.

When all field images for a ROI have been captured, image combination algorithms combined the field images into a single deep zoom image. A variety of image combination algorithms known in the art may be used. One nonlimiting exemplary class of algorithms, known as pattern matching algorithms, operate by mathematically aligning the edges of adjacent field images until they overlap, and then combining the images at the overlapping region. Where the specimen in a microscope slide has a relatively uniform thickness across the entire slide, it may be possible to obtain a high-quality deep zoom imaging by acquiring all of the field images for a target area at a single focus (i.e., at a single objective lens or Z-axis position). In many instances, however, variations in specimen thickness require the capture of a plurality of images of each field, with each image taken at a different focal plane to capture different portions of the image in focus. Focus scores may be calculated for each image, and a best image may be selected from the plurality of images, which is referred to herein as a Z-stack, for use in preparing the deep zoom/ROI image.

As used herein, the term "focal plane" refers to the roughly planar volume within a microscope specimen where the specimen's structures are in focus for a particular objective lens location (Z-axis position). Since the objective lens will have structures at a narrow range of depths in focus at any given Z-axis position, the focal plane more accurately refers to a depth of field having an upper and lower bound within which the specimen structures are in focus. While the focus point (i.e., focal length) and depth of field for a given objective lens is fixed, as the objective lens is moved in the Z-axis (i.e., perpendicularly) relative to the microscope slide, the focal plane may be adjusted to bring different narrow planar volumes of the specimen into focus.

Different microscope objective lenses have different depths of focus based on their magnifications, with the depth of field decreasing as the (fixed) magnification value of the objective lens increases. As nonlimiting examples, a 10× objective lens may have a depth of field of approximately 10 microns, meaning that at any given Z-axis position, a planar volume 10 microns in thickness will be in focus. A 20× objective lens, on the other hand, may have a depth of field of only about 4-5 microns, while a 40× objective lens may have a smaller depth of field of only about 1 micron, and a 60× objective lens may have a still smaller depth of field of only about 0.4 microns. In contrast, a 4× objective lens may have a depth of field of about 50 microns, i.e., significantly greater than the 10× objective lens. The foregoing values are illustrative only, and are not intended by to be descriptive of any particular lens. Moreover, the depth of field for a similar (e.g., 20×) objective made by different manufacturers may differ in their depths of field, although the general principles noted above apply.

Depending upon the particular WSI microscope, the user may select from among a variety of different focus modes to address variations in specimen thickness while capturing field images for combining into a deep zoom image. As nonlimiting examples, four different focusing modes will be briefly described, although fewer or additional focusing modes may be available depending upon the WSI microscope model under consideration. Without limitation, focus modes may include: 1) "initial focus" mode; 2) "fast stack" mode; 3) "exhaustive focus" and 4) "predictive focus" modes.

In initial focus mode, a single focus or Z-axis position (the "initial" focus) is used to capture all field images to be combined into the deep zoom ROI image. Because a single focus position is used, all of the images have the same depth of field corresponding to the single Z-axis position. Initial focus mode may produce a relatively high-quality image if the image is uniformly thick and flat across the entire ROI. However, image quality will suffer if the ROI area of the specimen is significantly "thicker" than the depth of field for the objective lens being used, or if there are variations in the thickness of the specimen within the ROI area that exceed the depth of field.

In fast stack focus mode, the WSI microscope automatically captures a small number of images at different focus (Z-axis) positions relative to the initial focus for each field image of the ROI. For example, the microscope may automatically capture one or two additional field images at higher focal planes than the initial focus image, and one or two additional field images at lower focal planes than the initial focus image. The number of images below and above the initial focus may be selected by the user, and the step size may be determined manually or automatically. A focus score may be calculated for each image, and a single image for the deep zoom ROI image may be selected based on the focus scores.

For relatively thick specimens, or where there are significant variations in thickness, exhaustive focus mode extends the fast stack concept by capturing a relatively large number of images (referred to as a Z-stack) to offer a better likelihood of capturing an image in good focus. Exhaustive focus mode uses an initial focus or Z-axis position for a first field location within the ROI (i.e., a slide stage position defined by specific X and Y slide stage coordinates) as a reference point. From the initial focus position (which may be manually or automatically determined) the microscope automatically moves a user-defined focal distance (e.g., 50 microns, 100 microns, 200 microns, etc.) above or below the initial focus position, and then captures a first image in the Z-stack. For example, if a user defines a Z-axis focal distance of 200 microns above the initial focus position, for each field image in the Z-stack, the microscope begins capturing images 200 microns above the initial focus position. Additional images in the Z-stack are captured at a series of locations after moving the objective lens a defined Z-axis step distance (e.g., 5 or 10 microns) towards the initial Z-axis focus position.

Focus scores are automatically determined immediately after capturing each field image, and a trend of focus scores is noted. When a local maxima (or minima, depending upon how the focus score is calculated) is noted and there is a high confidence that further focus scores will continue to be worse than the local maxima or minima, the Z-stack capture is terminated and the local maxima is used as the field image for that particular field location in the deep zoom/ROI image. If there is no clearly defined local maxima or minima indicating a "best" image, the microscope continues to capture images until a predetermined number of images in the Z-stack are captured or until the objective lens moves within a predefined safety margin from the slide specimen or cover slip, at which point Z-stack capture is terminated and an image is selected based on the focus scores.

Predictive focus mode combines some features of initial focus and exhaustive focus modes. Only one field image is captured for each field image/tile of a deep zoom image in predictive focus. However, "predictive focus," in which a focus map is created by capturing a number of exhaustive focus fields at a select number "predictive" field locations (e.g., 9 locations in a rectangular grid pattern in the ROI, each location defined by X, Y slide stage position coordinates) and selecting the best Z-axis focus position for each of the predictive fields, based on the best focus score for the images within a Z-stack of field images captured at each of the predictive field locations. A single focus (Z-axis position) for all remaining fields in the ROI are predicted by interpolation from the best focus positions for each of the predictive field locations. Interpolation may be by a variety of methods, e.g., linear interpolation or polynomial-based interpolation. The deep zoom image is prepared from the single predictive focus image captured at each field position using the Z-axis position that was interpolated from the predictive field locations.

For some types of microscope specimens, however, it is impossible to obtain a single image in which all desired structures are in focus, particularly when using objective lenses of 10× or greater. These include, for example, many three-dimensional specimens such as insects, and slides with microorganisms or other structures distributed at random in a relatively thick slide volume. Because the depth of field of objective lenses decrease as their magnification increases, for higher magnification objective lenses it becomes increasingly more likely that even a relatively thin and uniformly thick specimen may have structures with poor focus. Accordingly, in many cases the foregoing focus options may be inadequate to provide a properly focused image meeting the needs of a given task. For example, in applications demanding highly focused images of thick specimens (e.g., where the structures of the specimen are deeper or "taller" than the objective lens depth of field) it may be necessary to obtain numerous images at numerous focus planes from the top of the slide to the bottom of the cover slip.

More recently, image processing techniques combining the best-focused portions from multiple images having different focal planes have been developed. Known generally as extended depth of field (EDF), the technique generally involves identifying those structures within the objective lens's depth of field for each image in a Z-stack, and combining all of the "in-focus" structures from each of the images in the Z-stack to obtain an image in which all, or nearly all, structures are in focus. Although EDF images are useful for many tasks, in some instances the user may need to have access to all of the images forming the various levels (Z-axis position field images) of the Z-stack.

Because it is difficult to visually display and observe differences for a multiplicity of images on a single computer screen, there is a need for improved display tools for allowing users to view multi-layer images in a Z-stack. In addition, there is a need for improved display tools allowing users to view multi-angle images in WSI microscopes capable of taking images of birefringent specimens at a plurality of polarized light angles between a polarizer and a polarized analyzer. There is a further need for improved display tools allowing users to view multi-region images in WSI microscopes capable of capturing images from multiple regions of a single microscope slide.

SUMMARY

In one embodiment, the invention comprises a graphical user interface (GUI) for displaying on a display monitor at least a portion of a desired deep zoom image of a plurality of deep zoom images in a digital microscope system having a movable slide stage and an objective lens, each deep zoom image comprising an image assembled from a plurality of field images captured at different slide stage positions and the same objective lens focus position, and each deep zoom image assembled from field images captured at a different objective lens focus position from the objective lens focus position of the field images from which the other deep zoom images in the plurality of deep zoom images are assembled, the GUI comprising: an image selection area comprising: a plurality of graphical representations, wherein each graphical representation corresponds to one of the plurality of deep zoom images, and wherein the relative position of each graphical representation within the plurality of graphical representations indicates the relative position of the microscope objective lens when capturing field images from which the corresponding deep zoom image is assembled, relative to the objective lens position when capturing the field images from which the other deep zoom images in the plurality of deep zoom images are assembled; an image selector for selecting one of the plurality of deep zoom images for display by selecting the graphical representation corresponding the deep zoom image selected for display; an image selection indicator for indicating which of the deep zoom images has been selected for display by indicating the graphical representation corresponding to the deep zoom image selected for display; and an image display area in which at least a portion of the deep zoom image selected for display is displayed.

In one embodiment, the invention comprises a graphical user interface (GUI) for displaying on a display monitor at least a portion of a desired deep zoom image of a plurality of deep zoom images in a fixed image acquisition digital microscope system having a movable slide stage and an objective lens, each deep zoom image comprising an image assembled from a plurality of field images captured at different slide stage positions and the same objective lens focus position, and each deep zoom image assembled from field images captured at a different objective lens focus position from the objective lens focus position of field images from which the other deep zoom images in the plurality of deep zoom images are assembled, the GUI comprising: an image selection area comprising: a plurality of graphical representations arranged vertically, each graphical representation corresponding to one of the plurality of deep zoom images, wherein the relative position of each graphical representation vertical arrangement indicates the relative position of the microscope objective lens when capturing field images from which the corresponding deep zoom image is assembled, relative to the objective lens position when capturing the field images from which the other deep zoom images in the plurality of deep zoom images are assembled; an image selector for selecting one of the plurality of deep zoom images for display; and an image display area in which at least a portion of the deep zoom image selected for display is displayed.

In one embodiment, the invention comprises a graphical user interface (GUI) for displaying on a display monitor at least a portion of a desired deep zoom image of a plurality of deep zoom images in a fixed image acquisition digital microscope system having a movable slide stage, an objective lens, a polarizer and a polarized analyzer positionable at a polarity angle relative to one another, each deep zoom image comprising an image assembled from a plurality of field images captured at different slide stage positions and the same polarity angle between the polarizer and polarized analyzer, and each deep zoom image assembled from field images captured with the polarizer and polarized analyzer positioned at a different polarity angle from the polarity angle of field images from which the other deep zoom images in the plurality of deep zoom images are assembled, the GUI comprising: an image selection area comprising: a plurality of graphical representations, wherein each graphical representation corresponds to one of the plurality of deep zoom images, and wherein the relative position of each graphical representation within the plurality of graphical representations indicates the polarity angle of the polarizer and polarized analyzer relative to the polarizer angle of field images from which the other deep zoom images in the plurality of deep zoom images are assembled; an image selector for selecting one of the plurality of deep zoom images for display; and an image display area in which at least a portion of the deep zoom image selected for display is displayed.

In one embodiment, the present invention relates to a graphical user interface (GUI) for displaying a selected image of a plurality of images of a target area or region of interest (ROI) of a microscope slide specimen in a digital slide scanning microscope, wherein each image in the plurality of images is an image acquired from a different objective lens position from the other images in the series of images.

BRIEF DESCRIPTION OF THE DRAWINGS

The patent or patent application file contains at least one drawing executed in color. Copies of this patent or patent application publication with color drawing(s) will be provided by the Office upon request and payment of the necessary fee.

DESCRIPTION

Figure 1A:
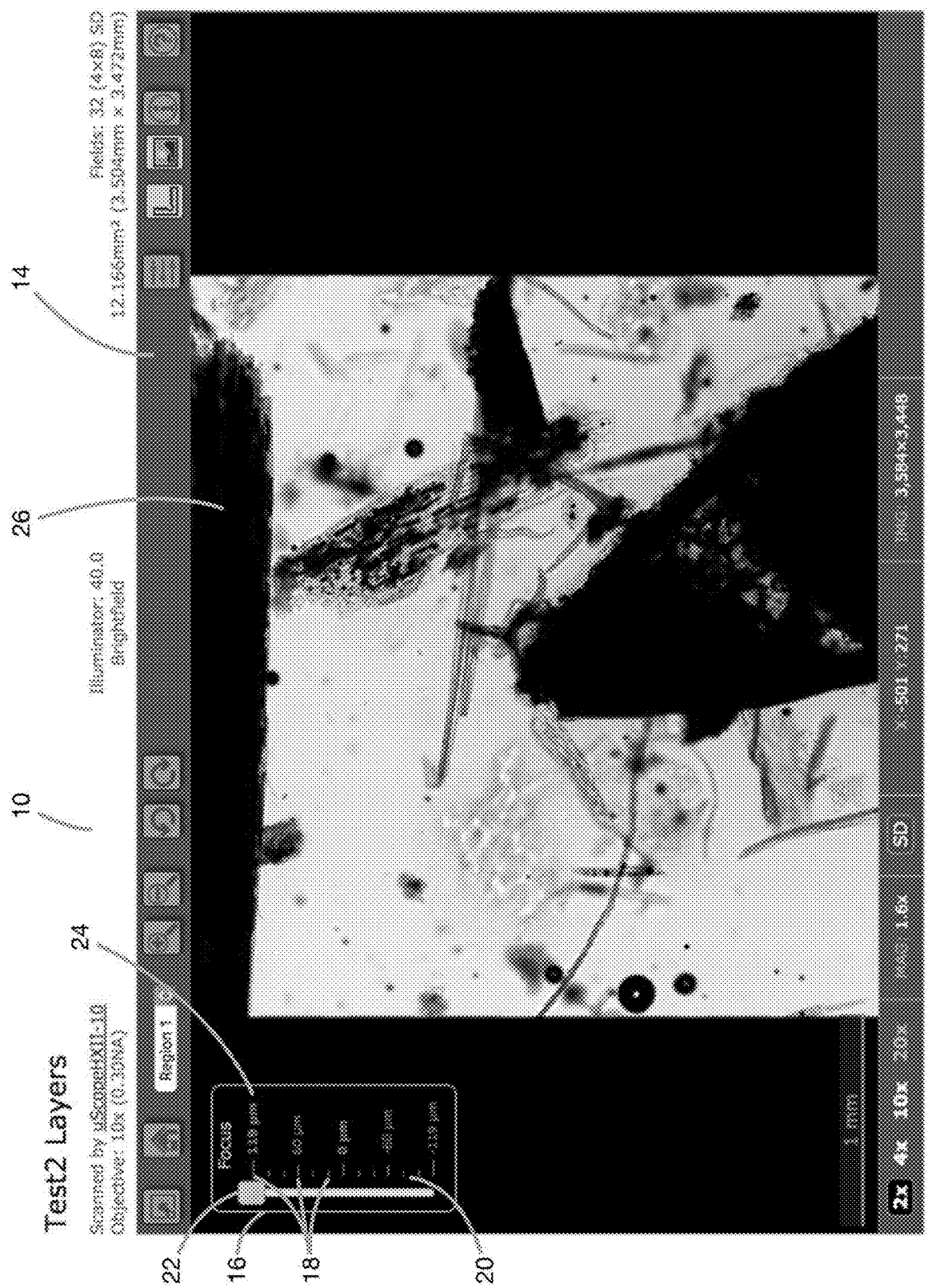
FIGS. 1A-1E are images showing a graphical user interface for selection of a desired deep zoom image from among a plurality of deep zoom images of a target area of a microscope slide, where each of the deep zoom images has a different focal plane.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well-known structures and components are shown in a single or simplified form in order to avoid obscuring such concepts. Exemplary embodiments of the present disclosure are illustrated in the drawings, which are illustrative rather than restrictive. No limitation on the scope of the technology or on the claims that follow is to be implied or inferred from the examples shown in the drawings and discussed here.

Embodiments of the invention involve user interfaces for display of a desired deep zoom image from among a plurality of deep zoom images in a fixed image acquisition (FIA) whole slide imaging (WSI) digital microscope. In various embodiments, each of the plurality of deep zoom images is an image that is captured at one or more of a different focus position, polarizer angle, or target area/ROI of the slide from other deep zoom images.

In one embodiment, each of the plurality of deep zoom images is an image captured at a different objective lens (Z-axis) focus position, and is prepared by digitally combining a plurality of individual field images/tiles captured at the same Z-axis focus position but at different slide stage positions, into a single deep zoom image covering the entire target/ROI area. A computer or other processor controls the operations of the digital microscope, including without limitations the acquisition of field images at each of a plurality of objective lens focus positions, and combining them into a series of deep zoom image, each combined from field images captured at a single objective lens focus position. Because each of the plurality of deep zoom images is a different focus "layer" of the ROI captured at a different Z-axis focus position, each deep zoom image captures different portions of the specimen in focus. According, each deep zoom image may be referred to herein as a layer in a deep zoom multi-layer image set. The deep zoom layers together represent images from a desired focus thickness or focus depth of the microscope specimen that is greater than the depth of focus of the objective lens. As used herein, the term "focus depth" of the multi-layer image set refers to the distance between the Z-axis position of the objective lens of the uppermost (top) and lowermost (bottom) layers of the multi-layer deep zoom image set. The user interface may comprise a graphical user interface (GUI) for display of a selected layer of the multi-layer deep zoom image set.

In one embodiment, shown in FIGS. 1A-1E, the GUI 10 includes an image selection area 16 allowing a user to select a desired layer in a multi-layer image set 12 for viewing on a display 14 (e.g., a computer screen or monitor). The terms display and monitor or screen may be used interchangeably. Each of FIGS. 1A-1E illustrates, in an image display area 26, a portion of a different layer in the multi-layer image set 12. In the embodiment of FIGS. 1A-1E, the image selection area 16 comprises a box labeled "Focus," and includes a plurality of vertically arranged horizonal bars 18 that together comprise a scale 20. Each of the horizontal bars 18 corresponds to an image layer of the multi-layer deep zoom image set, and to a scaled distance from the center of the desired focus thickness of the specimen. In the embodiment of FIGS. 1A-1E, for ease of viewing, only some of the horizontal bars are labeled with the distance (e.g., 119 µm or microns) from the center image of the Z-stack at which the field images for that deep zoom layer were captured. In other embodiments (not shown), all of the horizontal bars may be labeled with the distance from the centermost image at which the image for that bar was captured (i.e., the Z-axis distance that the objective lens was moved from the center image objective lens position). The horizontal bars 18 (and the deep zoom image layer to which each bar corresponds) may be selected (e.g., using a mouse or keypad) by moving a vertical slider bar 22 on the left side of the image scale.

It will be appreciated that, although FIGS. 1A-1E use horizontal bars 18 as graphical representations of each of the image layers of the multi-layer image set 12, in alternative embodiments (not shown) other graphical representations or symbols representing each of the layers may be provided. It will also be appreciated that other image selector devices may be provided to select a particular deep zoom image of the multi-layer image set for display (e.g., buttons instead of a slider bar 22, or up/down toggle keys on a keyboard) may be used, and all are considered as within the scope of the present disclosure.

In the image set of FIGS. 1A-1E, there are a total of thirteen (13) images, as represented by the thirteen horizontal bars 18. It will be understood, however, that in alternative embodiments, different numbers of bars 18 (i.e., more or fewer than thirteen) may be provided in image sets having different numbers of deep zoom layers. In addition, other ways of indicating the total focus depth of the deep zoom layers may be used instead of that described above. For example, instead of indicating the Z-axis positions of the layer relative to a central layer (i.e., using the center of the total focus distance of the multi-layer images as the reference point), the uppermost or lowermost layer in the deep zoom image set may be used as the reference (zero) point, and the Z-axis distance for each layer may be indicated as a distance from the top or bottom layer instead of the center layer.

The scale 20 in FIGS. 1A-1E indicates that the uppermost and lowermost images in the deep zoom multi-layer image set 12 were each captured at a Z-axis focus position that is 119 microns from the Z-axis focus position of the center image of the focus thickness or depth of the Z-stack, as shown on the upper and lower horizontal bars 18. Together, the upper and lower bars indicate that the deep zoom image layers were captured by moving the objective lens a total distance of 238 microns from the uppermost image to the lowermost image, with each of the layers captured at a different intermediate position between the uppermost and lowermost positions. Thus, the total focus depth of the Z-stack of multi-layer images is 238 microns in the embodiment shown in FIGS. 1A-1E.

FIG. 1A further includes an image selection indicator 24 that indicates which image in the multi-layer image set is selected and displayed. In the embodiment of FIG. 1A, the image selection indicator comprises displaying the distance indicator for the horizontal bar 18 of the selected image in a different color from the other distances. Other image selection indicators 24 may be used, and all are considered within the scope of the invention. For example, in one embodiment (not shown) the image selection indicator 24 may comprise displaying a distance indicator only for the selected horizontal bar/image 18, and not displaying a distance for the other images in the multi-layer image set 12. In another example (not shown), the image selection indicator 24 may comprise displaying the distance indicator for the selected horizontal bar/image 18 in a larger or smaller font size compared to the distances for the other deep zoom image layers, or by using a different font type than used for the non-selected layers. Referring again to FIG. 1A, image selection indicator 24 shows that the uppermost image in the multi-layer image set has been selected and is being displayed, and that the objective lens (Z-axis position) for the field images/tiles for that deep zoom image were each captured at a distance of 119 microns above the centermost image in the Z-stack.

Figure 1B:
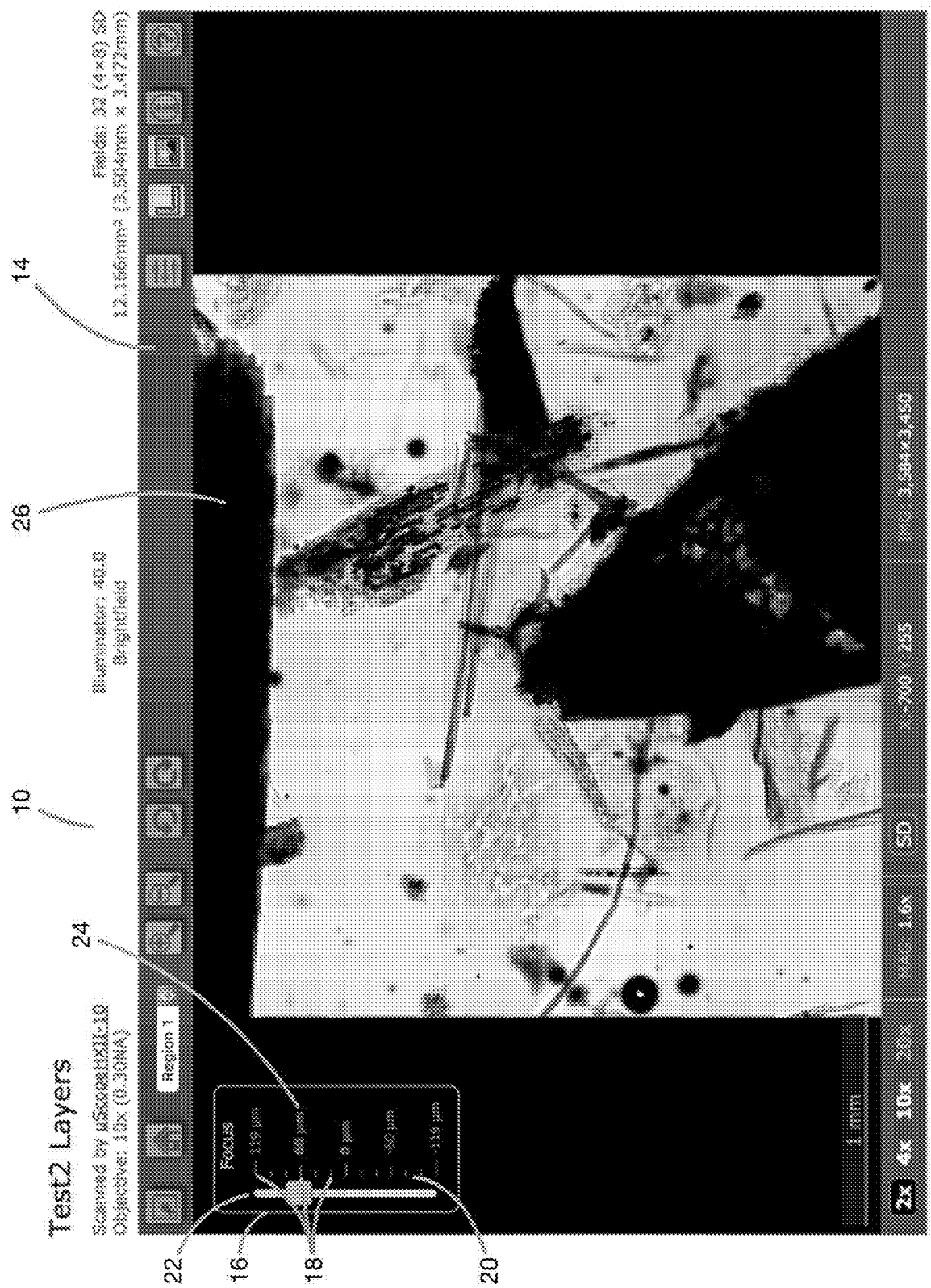
Figure 1C:
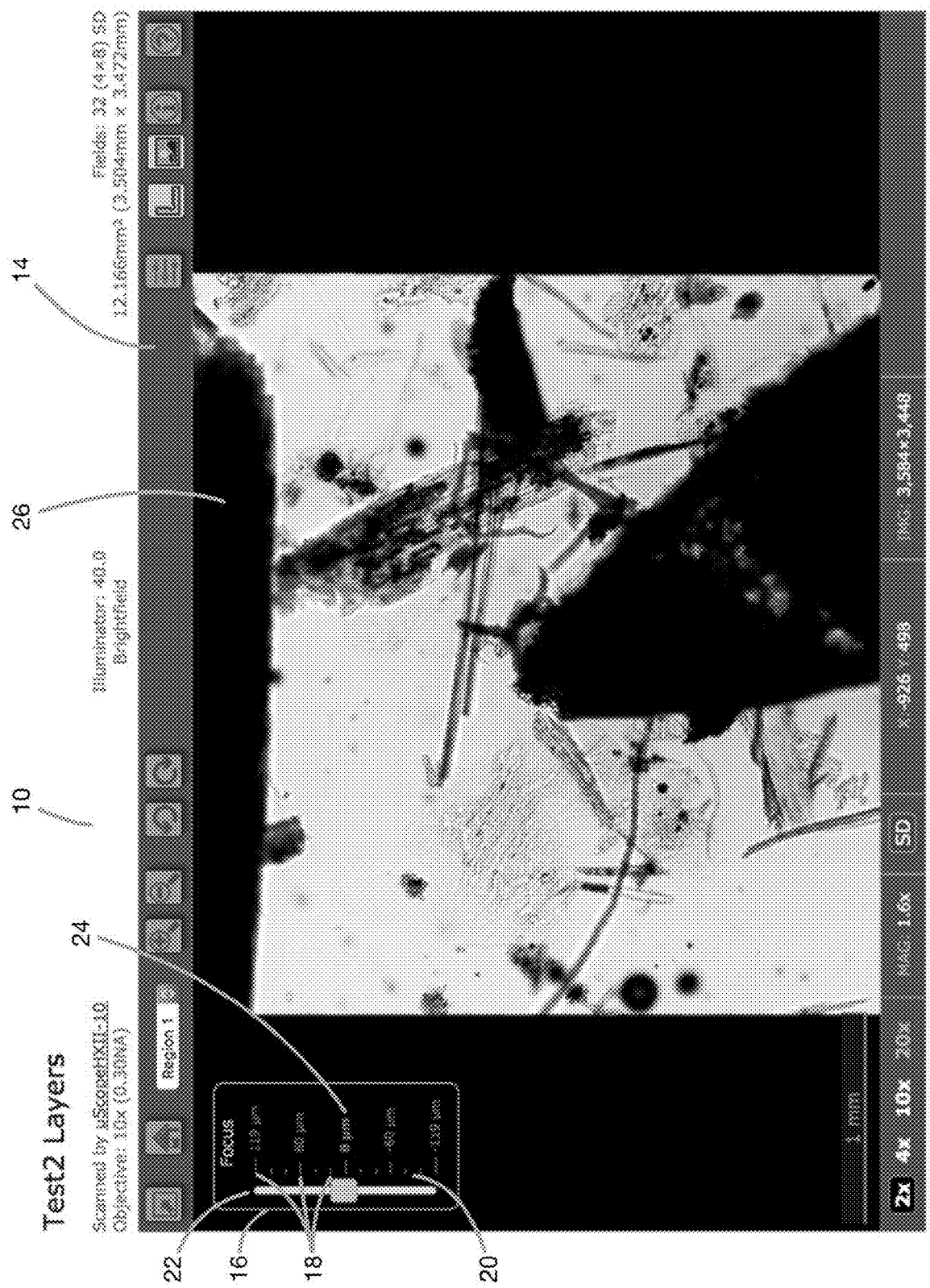
Figure 1D:
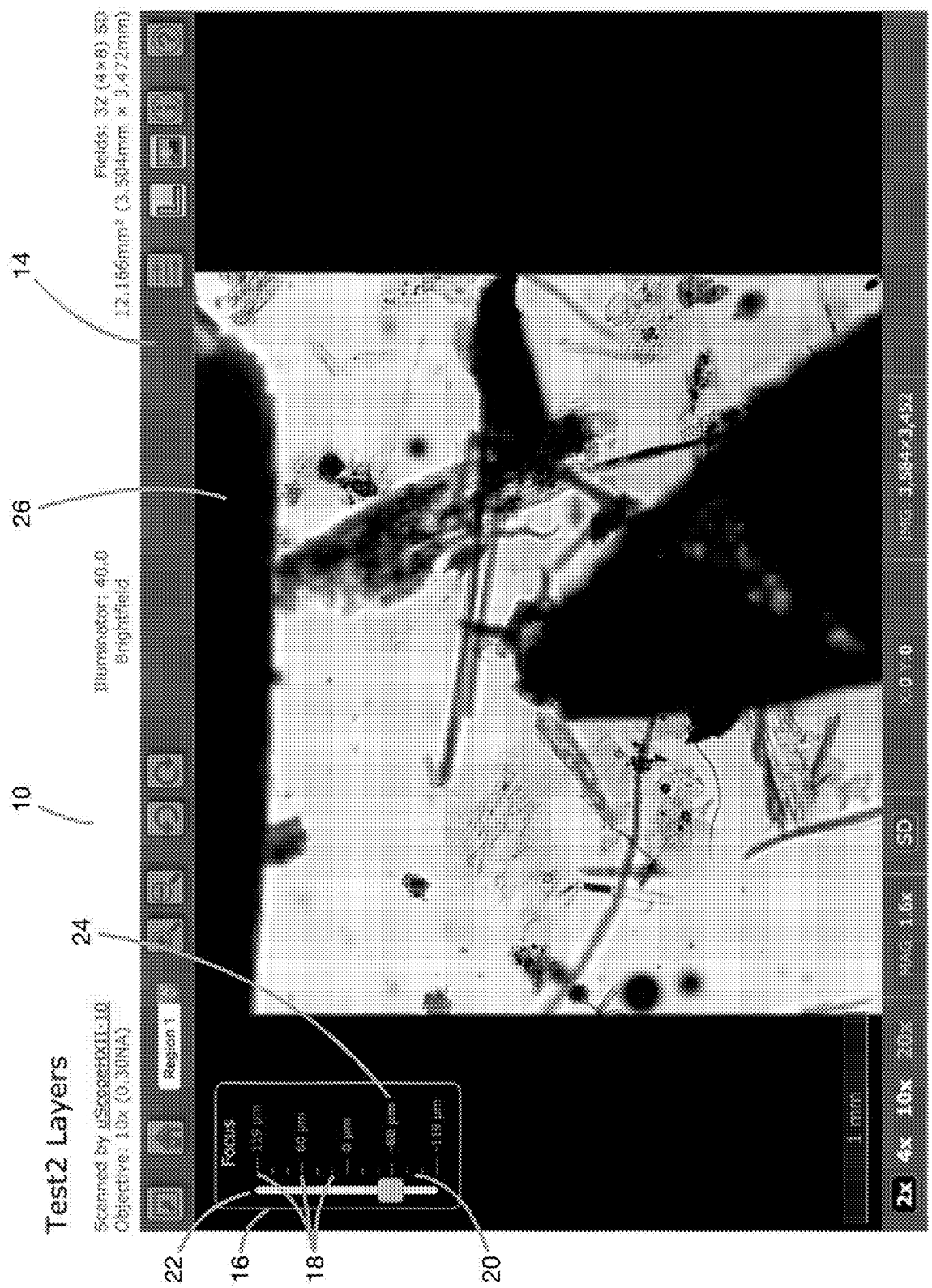
Figure 1E:
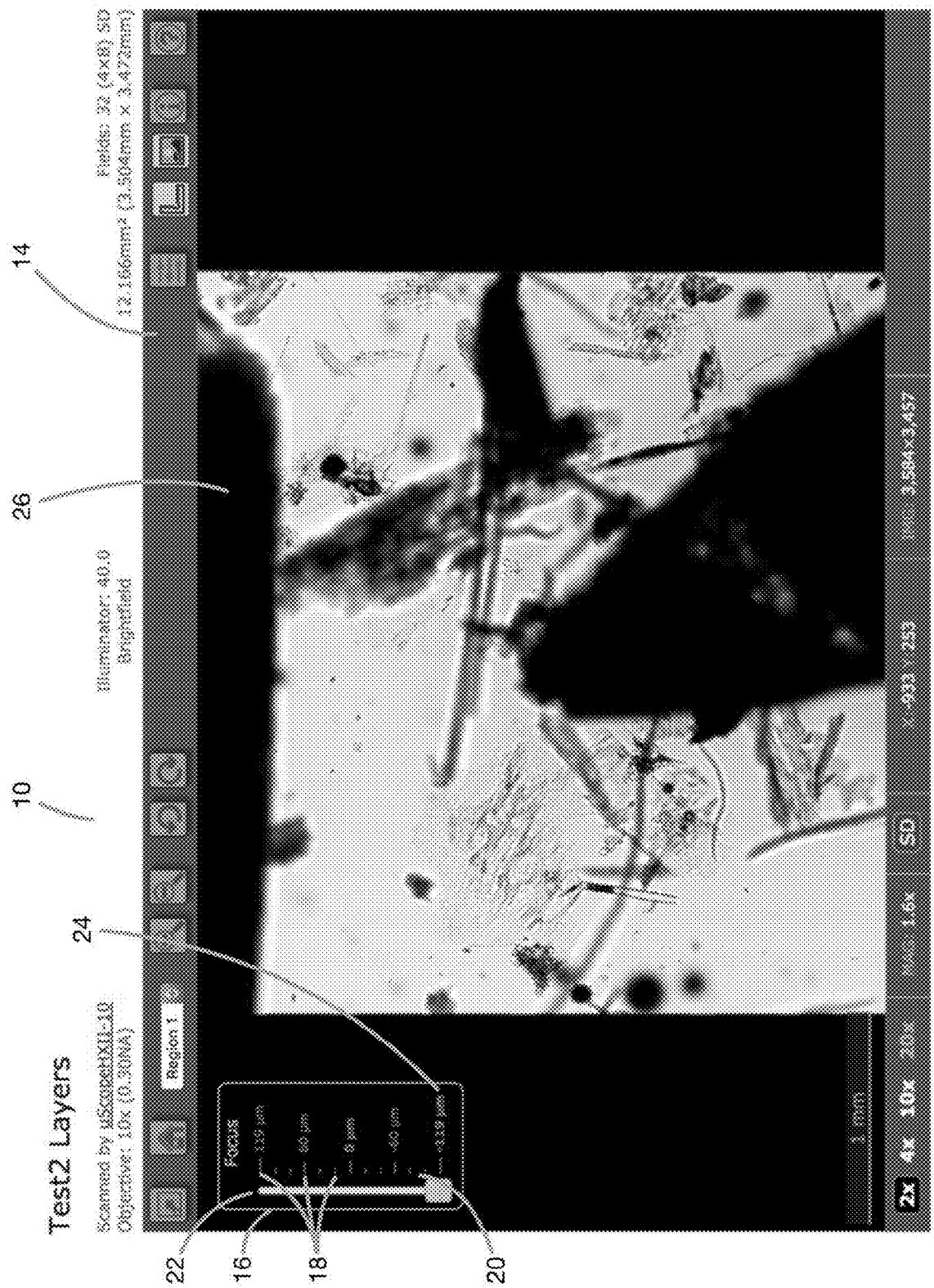

FIGS. 1B-1E illustrate the GUI 10 of FIG. 1A in which different image layers of the deep zoom image set 12 are selected and displayed for viewing. FIG. 1B indicates (by the color of the distance indicator for the selected bar/image 18) that the layer captured at a distance of 60 microns above the central image of the Z-stack is selected and displayed. FIG. 1C illustrates the GUI of FIG. 1A in which the central image (0 microns from the center) of the Z-stack of multi-layer images 12 has been selected and is being displayed. It will be appreciated that the position of each individual horizontal bar 18 within the group of horizontal bars 18 indicates its relative position in the Z-stack relative to the other images in the multi-layer image set 12 (i.e., the horizontal bars above or below a specific horizontal bar 18 correspond to deep zoom image layers captured at Z-axis focus positions immediately above and below, respectively, the image of the specific horizontal bar). FIGS. 1D and 1E illustrate the selection and display of images at 60 microns and 119 microns, respectively, below the central image of the multi-layer image set 12.

FIGS. 2A-2E illustrate another implementation of the GUI 10 of FIG. 1, but applied to a different image set 12 having a different number of Z-stack layers to form a different multi-layer image set, as indicated by a different number of horizontal bars 18 in scale 20 of image selection area 16. The multi-layer image set of FIGS. 2A-E include seventeen (17) ROI images, each formed, like those of FIGS. 1A-1E, from a plurality of images captured at different X, Y slide stage coordinates but at the same Z-axis position. A slider bar 22 is used to select a particular image in the multi-layer image set for display. As with FIGS. 1A-1E, each horizontal bar that is selectable by the slider bar 22 corresponds to one image of the Z-stack multi-layer image set 12. As indicated by the numbers on the horizontal bars 18 of FIGS. 2A-2E, the images at the upper and lower ends of the Z-stack are each 198 microns from the center image. Accordingly, multi-layer image set 12 of FIGS. 2A-2E has a total focus depth of 396 microns (i.e., the objective lens at which the uppermost image of the image set was captured was 396 microns above its position in capturing the lowermost image of the images set). Thus, the multi-layer image set of FIGS. 2A-2E has a greater total focus depth (396 microns) than the image set of FIGS. 1A-1E (238 microns). In addition, the multi-layer image set in FIGS. 2A-2E includes a greater number of images (17) than in FIG. 1 (13).

Figure 2A:
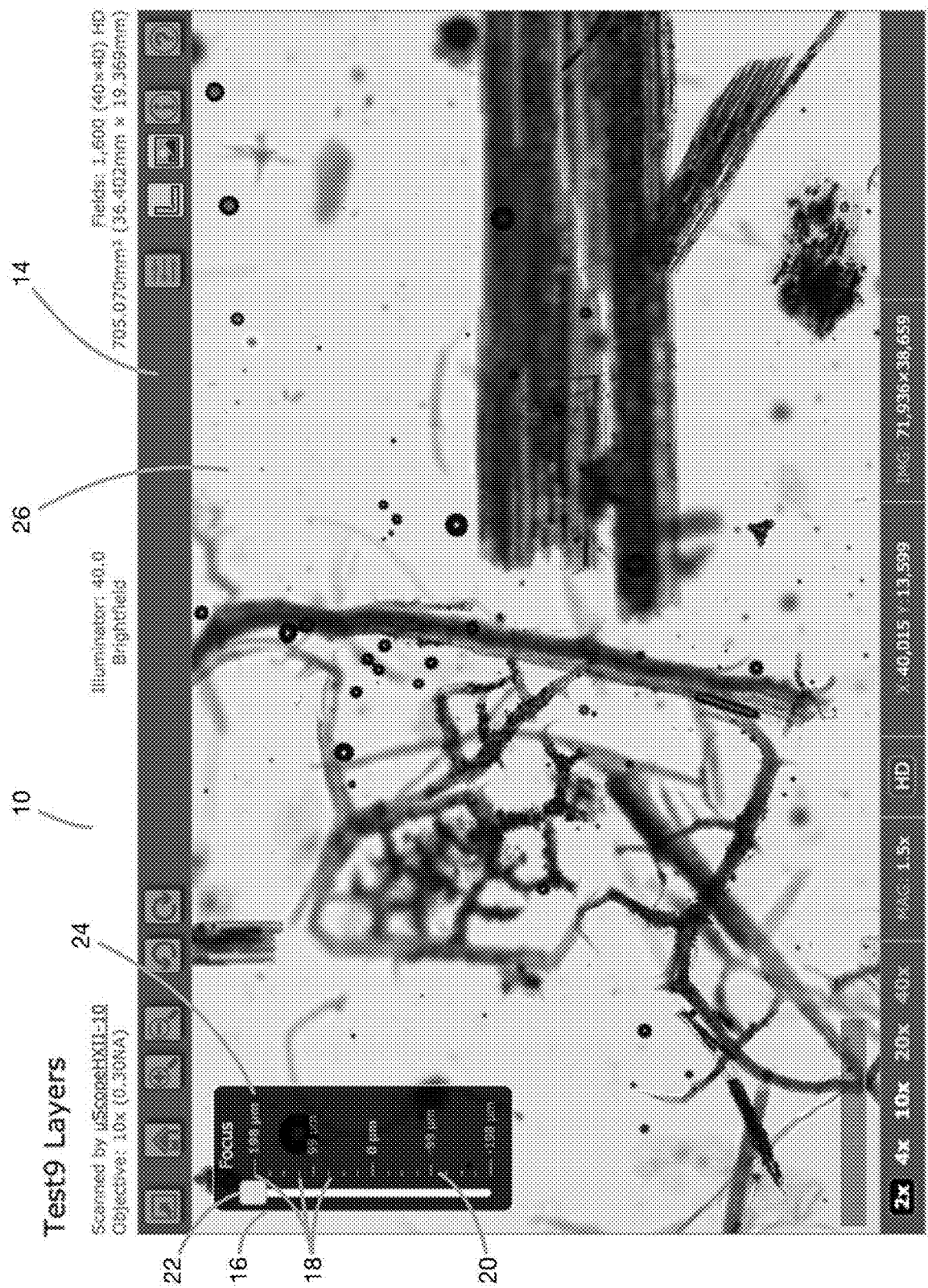
FIGS. 2A-2E are images showing a graphical user interface for selection of a desired deep zoom image from among a plurality of deep zoom images of a target area of a microscope slide, where each of the deep zoom images has a different focal plane.

FIG. 2A illustrates that the uppermost image in the multi-layer image set 12 has been selected for display, as indicated by the image selecting indicator 24, which comprises a different color from the non-selected images. In alternative embodiments, different indicators (e.g., text size or font) may be used to indicate which layer has been selected and is being displayed. As the distance indicator for the selected horizontal bar 18 of FIG. 2A indicates, the displayed image was captured at an objective lens position 198 microns above the centermost image of the Z-stack.

Figure 2B:
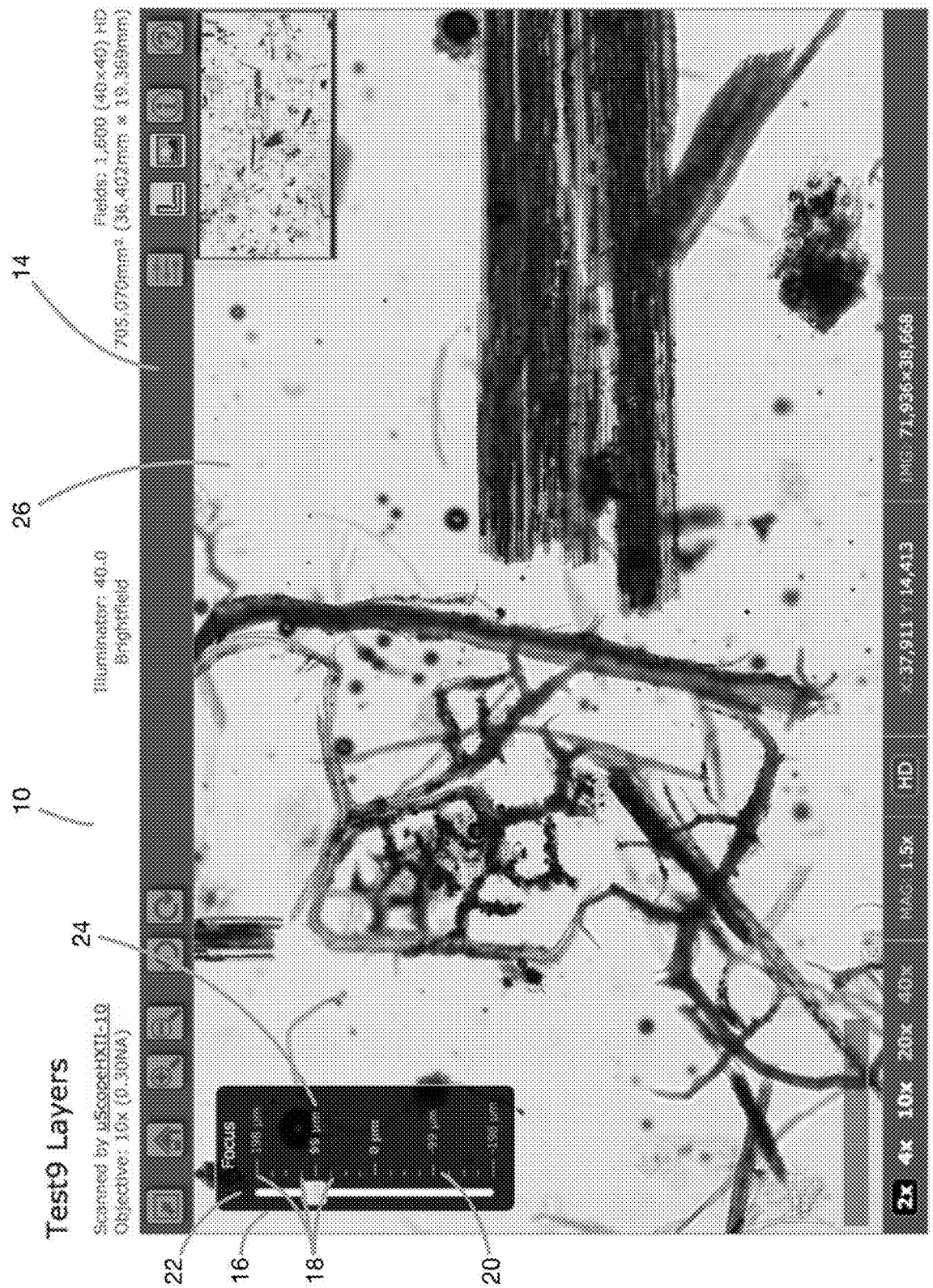
Figure 2C:
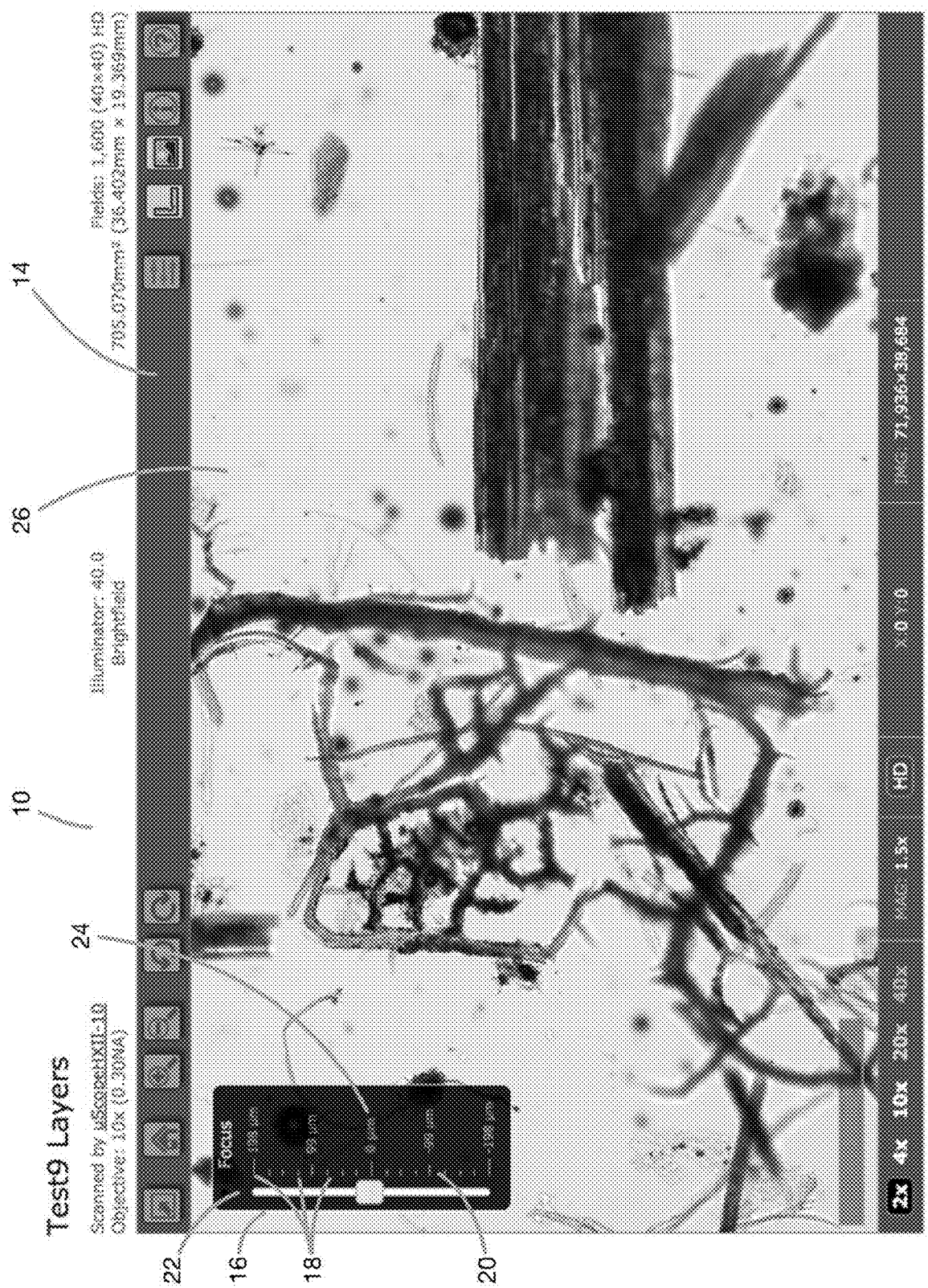
Figure 2D:
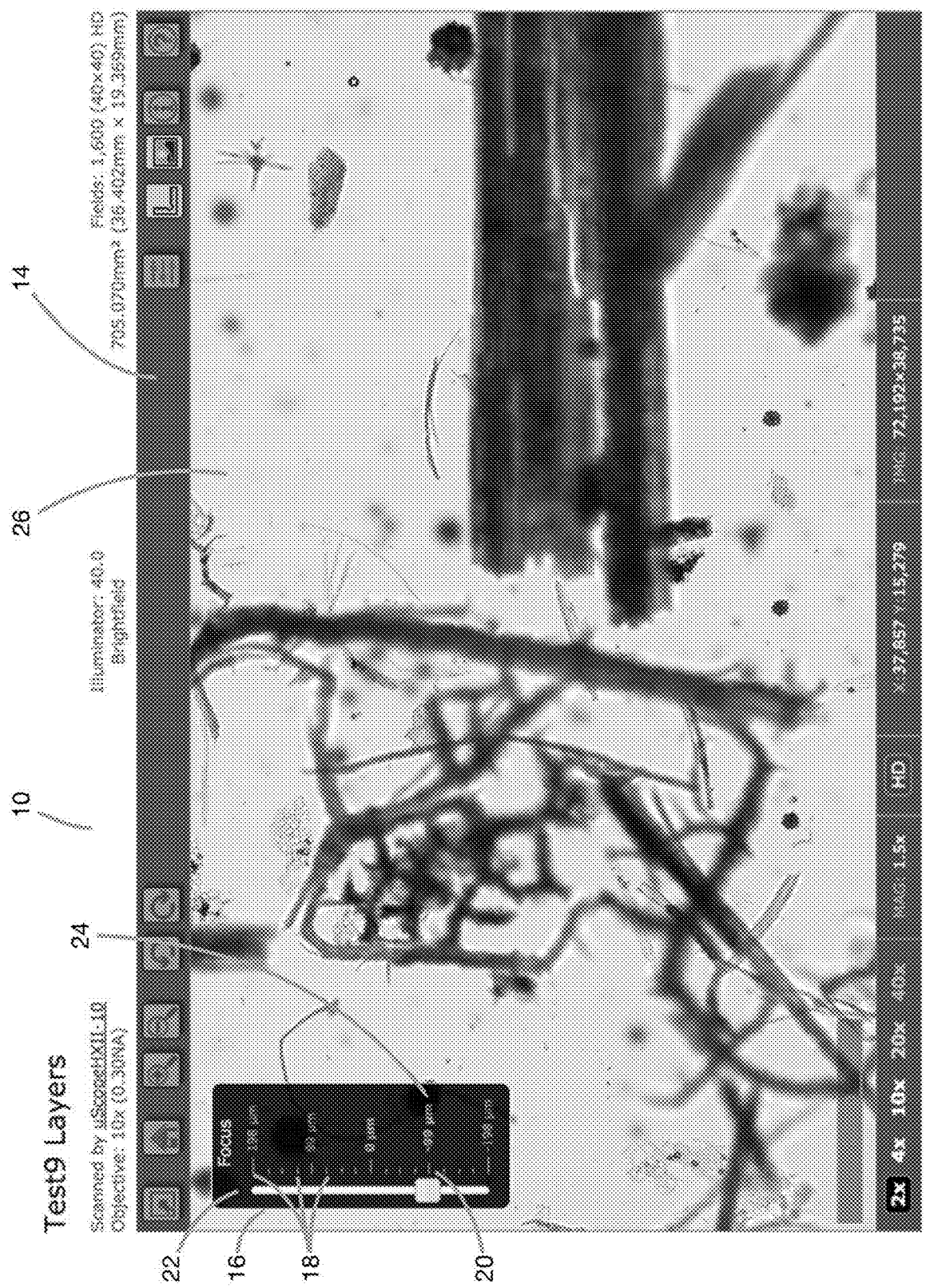
Figure 2E:
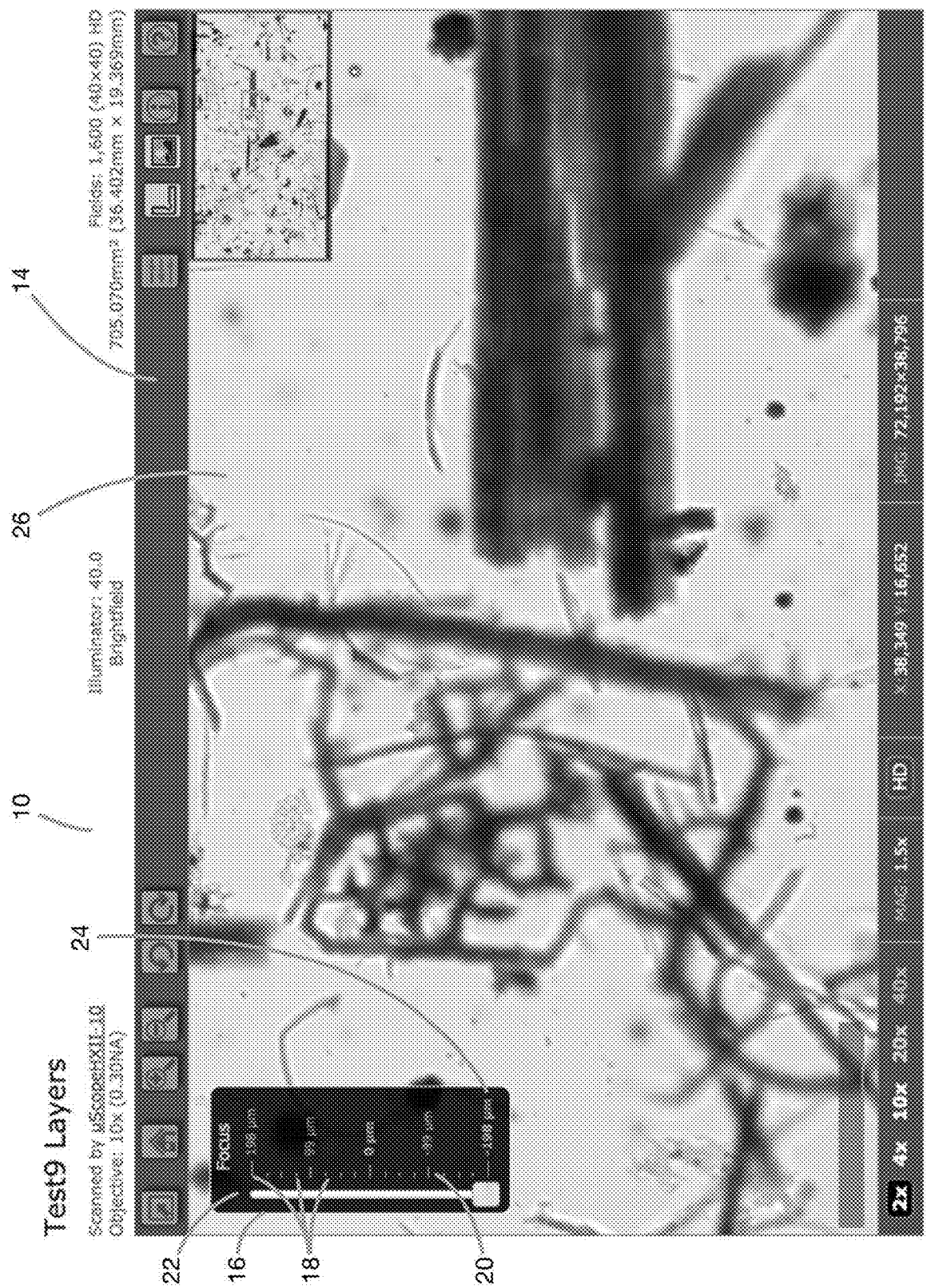

The images of FIGS. 2B-2E indicate that different images in the multi-layer image set have been selected and are displayed from the image of FIG. 1. FIG. 2B indicates the selection of an image in which the objective lens was positioned 99 microns from the central image of the multi-layer image set 12 while the field images comprising the combined ROI image were captured. FIG. 2C indicates that the central image of the multi-layer image set (0 microns from the center) is selected and displayed. As with FIG. 1, the relative positions of each image in the Z-stack are provided by the relative positions of their corresponding horizontal bars within the vertical scale. FIGS. 2D and 2E illustrate the selection and display of images that were captured at an objective lens position of 99 microns and 198 microns, respectively below the central image of FIG. 2C.

In one embodiment (not shown) an animation selector may be provided to automatically toggle and display the images in the Z-stack of images sequentially at a specified frame rate. For example, the user may cause each of the 13 images in the Z-stack of FIG. 1, or the 17 images in the Z-stack of FIG. 2, to be sequentially displayed (or cycled through) every 0.2 seconds, 0.5 seconds, 1 second, or other desired multi-level animation time period. In one embodiment, the animation time period is a time period within the range of 0.1 seconds to 5 seconds. In some embodiments, the user may select only a portion of the images (e.g., by a mouse click while displaying the figure) for animation. For example, only every other Z-stack image (or every third image, or only the uppermost or lowermost images) may be selected for animation.

FIGS. 3A-3D illustrate a GUI 50 for viewing on a display 54 (e.g., a computer screen or monitor) one of a series of deep zoom images captured by a slide scanning microscope system in which the specimen is illuminated, in some instances, by polarized light. In one embodiment, the GUI is provided in slide scanning microscope system having a polarizer and a polarized analyzer that each allow light to pass through them in a single plane. By disposing the angle of the polarity planes for the polarizer and analyzer at a desired angle to one another (referred to hereinafter as the "polarity angle"), the polarizer and analyzer together comprise a pair of crossed polarizing filters that may be used to illustrate the birefringence of different substances (e.g., minerals or birefringent biomaterials such as collagen) in microscope specimens. The slide scanning microscope may, in some embodiments, permit capture of field images/tiles (which may be assembled into deep zoom images from a plurality of field images covering a target area) without a polarizer (i.e., a brightfield image using non-polarized light), or using polarized light passing through both the polarizer and analyzer positioned (e.g., by rotation) of one or both of the polarizer and analyzer one or more desired polarity angles. Polarized deep zoom images such as those of FIGS. 3A-3D, which may comprise a plurality of images including a brightfield deep zoom image and one or more deep zoom images captured at different polarity angles, are referred to herein as a "multi-angle image set"

Figure 3A:
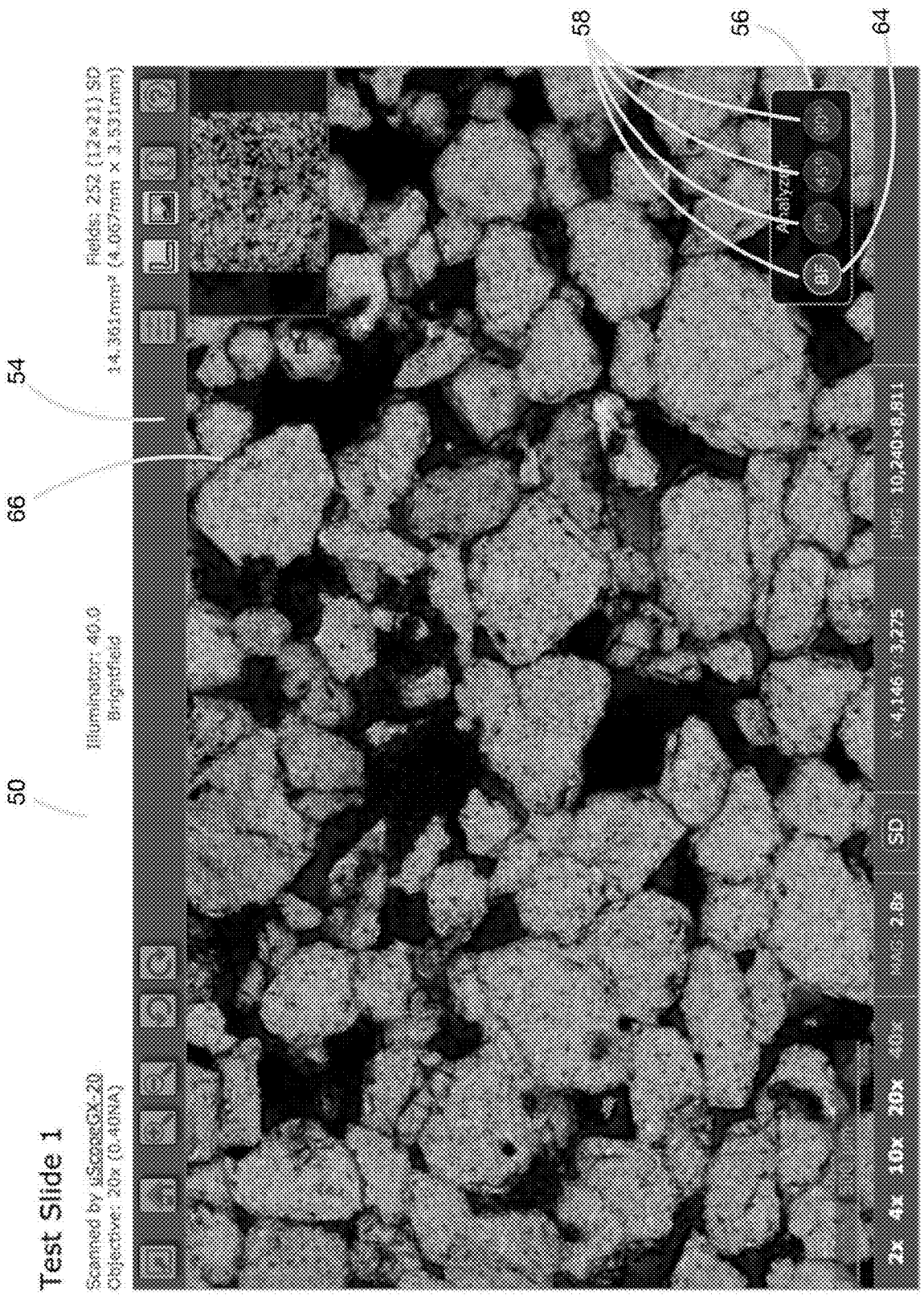
FIGS. 3A-3D are images showing a graphical user interface for selection of a desired deep zoom image from among a plurality of deep zoom images of a target area of a microscope slide, where each of the deep zoom images has a different polarity angle.
Figure 3B:
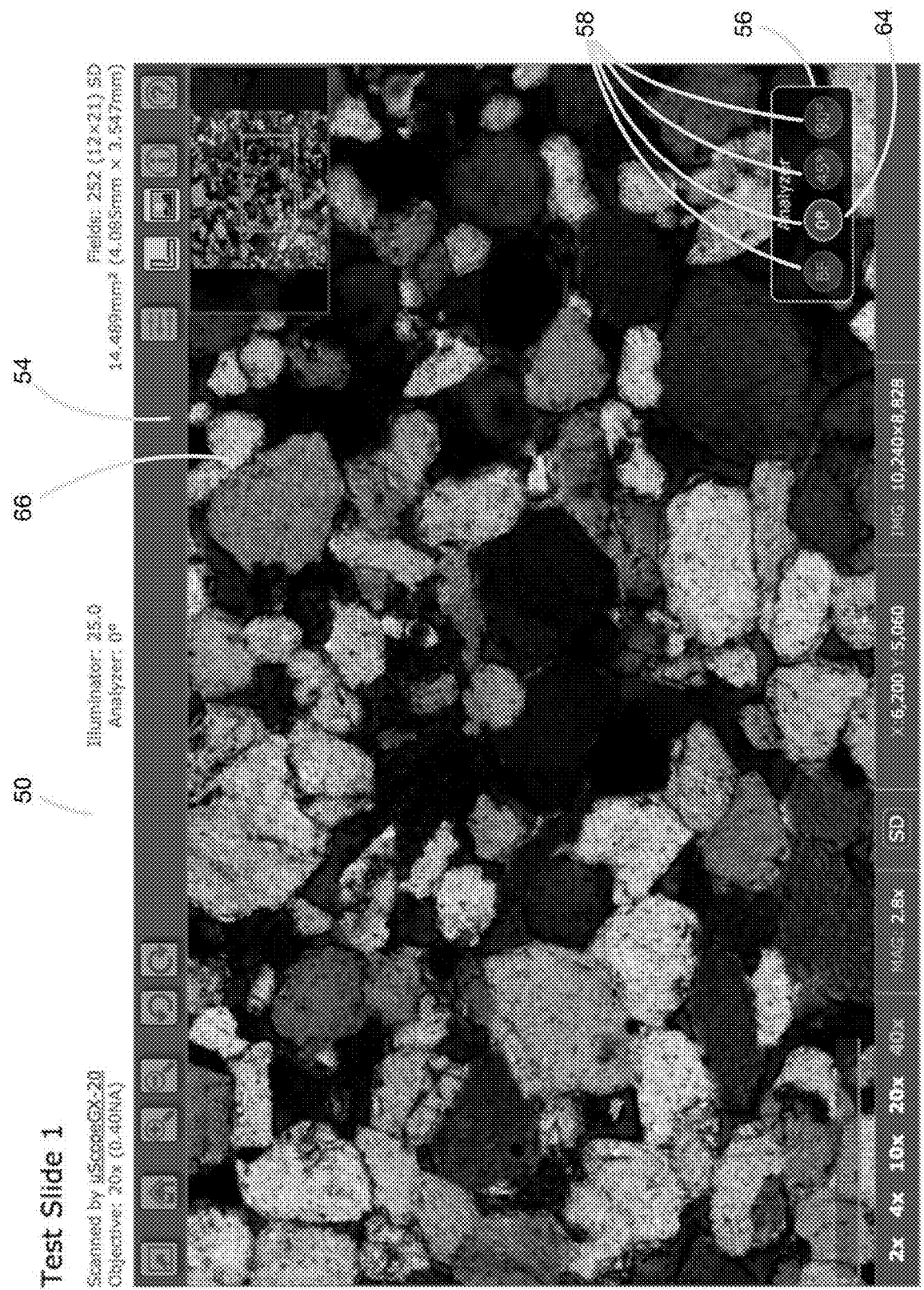
Figure 3C:
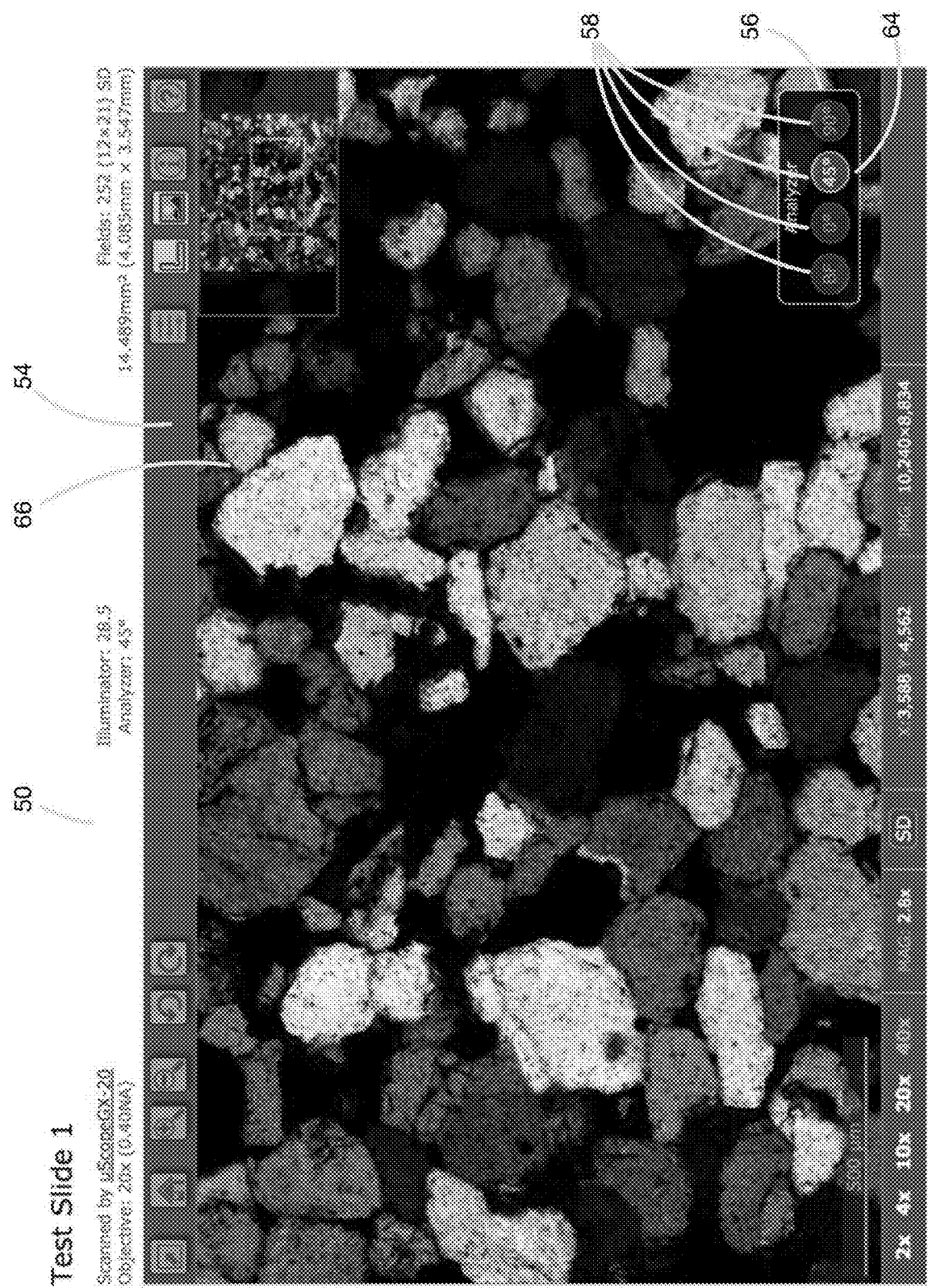
Figure 3D:
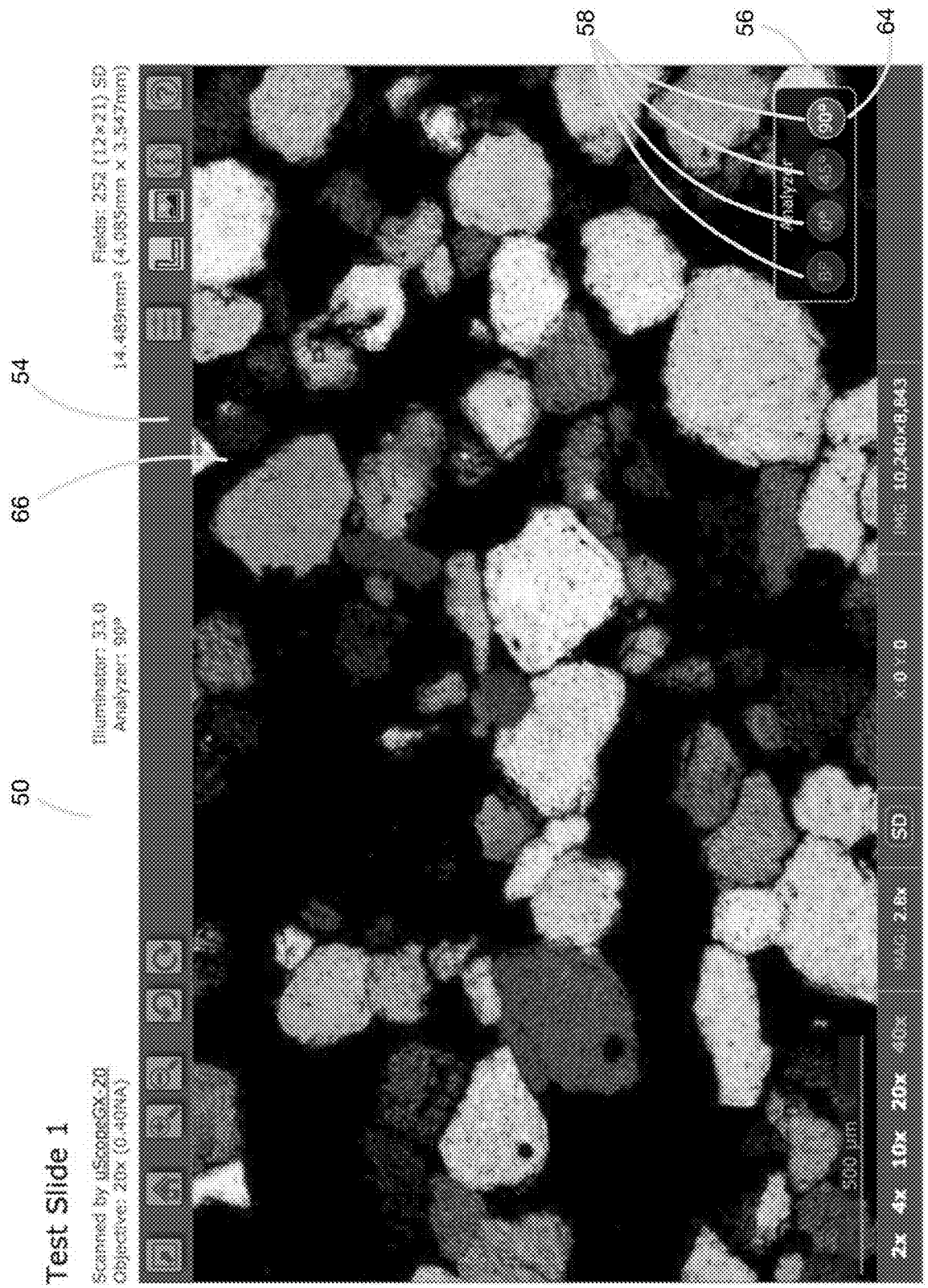

The images of FIGS. 3A-3D together comprise a multi-angle deep zoom image set 52 for viewing on a display 54 (e.g., a computer screen or monitor). The multi-angle image set of FIGS. 3A-3D include four deep zoom images, each assembled from a plurality of field images captured at different X, Y slide stage coordinates but illuminated either by non-polarized light (a brightfield, non-polarized image, FIG. 3A) or at different polarity angles between the polarizer and analyzer (FIGS. 3B-3D). In practice, the images are captured by moving the stage to a series of X, Y slide stage positions covering the ROI, and at each position, a plurality of field images/tiles are captured, with one or more images captured for each of the different desired polarity angles and/or the brightfield illumination. The field images for each polarity angle or the brightfield image are then combined into a single deep zoom image for each respective set of deep zoom images.

The GUI 50 displays, in an image display area 66 of the display 54, a portion of a different image in the multi-angle deep zoom image set 52. The GUI 50 of FIGS. 3A-3D includes an image selection area 56 that comprises a box labeled "Analyzer," and which includes a series of selectable buttons or tabs 58 (in, e.g., a touchscreen area of the display 54). Each of the selectable tabs 58 corresponds to an image in the multi-angle deep zoom image set 52. A user may select one of the images for display by selecting one of the four tabs or buttons 58. The buttons may include an image indicator (e.g., a label on each of buttons 58) to allow a user to identify the type of polarized light for each deep zoom image, and an image selection indicator 64 to indicate which image of the multi-angle deep zoom image set has been selected for display FIG. 3A illustrates that a brightfield image (i.e., an image in which the specimen was illuminated only by non-polarized light passing through neither the polarizer nor the analyzer) has been selected by the user for display, as indicated by the highlighted circular outline that is used as an image selection indicator 64 for the leftmost button (labeled "BF") in image selection area 56. A cross-reference to the full deep zoom image, shown in a thumbnail window in the upper right-hand corner of display area 66, illustrates the portion of the full deep zoom image selected that is displayed in display area 66.

Differences associated with the birefringence of different minerals are shown in FIGS. 3B, 3C and 3D, which illustrate different deep zoom images captured from field images captured at different angles of polarized light illuminating the specimen. FIG. 3B illustrates that deep zoom image acquired at a polarity angle of 0° between the polarizer and illuminator has been selected, as indicated by the highlighted circular outline image selection indicator 64. In FIG. 3C, the deep zoom image having a polarity angle of 45° has been selected and displayed, and in FIG. 3D, the deep zoom image having a polarity angle of 90° has been selected and displayed.

As with the embodiment of FIGS. 1 and 2, in different use cases different angles may be selected by a user. For example, in a different use, the user may select angles of 15, 30, and 60 degrees for capture, and the display. The user may select any angle from 0° to 180° or even 360°.

In addition, the user may select all or a portion of the images for sequential display in an animation. An animator selector (not shown) may be provided to automatically toggle and display the images in the multi-angle deep zoom image set 52 sequentially at a specified frame rate. The user, for example, may cause each of the 4 images in FIGS. 3A-3D to be displayed or cycled through every 0.1 seconds, 0.5 seconds, 1 second, or other desired animation time period. In some embodiments, the user may select only a portion of the images for animation. For example, in the multi-angle deep zoom image set 52 of FIGS. 3A-3D, only the 0° and 45° polarity angle images may be selected and animated.

In another aspect, the present disclosure relates to a method of capturing and display a plurality of deep zoom images for display of one or more multi-level, multi-angle, or multi-region images.

In various embodiments, the present invention relates to the subject matter of the following numbered paragraphs.

101. A digital microscope system having a graphical user interface (GUI) for displaying on a display monitor at least a portion of a desired deep zoom image of a plurality of deep zoom images, each deep zoom image comprising an image assembled from a plurality of field images captured at different slide stage positions and the same objective lens focus position, and each deep zoom image assembled from field images captured at a different objective lens focus position from the objective lens focus position of the field images from which the other deep zoom images in the plurality of deep zoom images are assembled, the digital microscope system comprising:
   a slide scanning microscope comprising:
      a movable slide stage for holding a microscope slide having a specimen thereon;
      a plurality of slide stage motors capable of moving the slide stage to series of stationary slide stage positions;
      at least one objective lens;
      an objective lens motor capable of moving the objective lens to a series of stationary objective lens focus positions;
      at least one illuminator, wherein each of the at least one illuminators is optically coupled to one of the at least one objective lenses;
      at least one camera, wherein each of the at least one cameras is optically coupled to one of the at least one objective lenses and is capable of capturing a plurality of field images when the slide stage is positioned at a stationary slide stage position and the objective lens is positioned at a stationary objective lens focus position;
   a microscope control unit capable of controlling the operations of the slide scanning microscope, including assembling a plurality of field images into a deep zoom image of a target area of the specimen, wherein each deep zoom image comprises an image assembled from a plurality of field images captured at different slide stage positions and the same objective lens focus position, and each deep zoom image is assembled from field images captured at a different objective lens focus position from the objective lens focus position of the field images from which the other deep zoom images in the plurality of deep zoom images are assembled;
   a display for displaying at least a portion of deep zoom image of the plurality of deep zoom images; and
   a graphical user interface an image selection area comprising:
      an image selection area comprising:
         a plurality of graphical representations, wherein each graphical representation corresponds to one of the plurality of deep zoom images, and wherein the relative position of each graphical representation within the plurality of graphical representations indicates the relative position of the microscope objective lens when capturing field images from which the corresponding deep zoom image is assembled, relative to the objective lens position when capturing the field images from which the other deep zoom images in the plurality of deep zoom images are assembled;
         an image selector for selecting one of the plurality of deep zoom images for display by selecting the graphical representation corresponding the deep zoom image selected for display; and
      an image display area in which at least a portion of the deep zoom image selected for display is displayed.

102. The digital microscope system of claim 1001, wherein the GUI further comprises an image selection indicator for indicating which of the deep zoom images has been selected for display by indicating the graphical representation corresponding to the deep zoom image selected for display.

103. The digital microscope system of claim 102, wherein the image selection indicator comprises highlighting the graphical representation corresponding to the deep zoom image selected for display.

104. The digital microscope system of claim 101, wherein the, wherein the plurality of deep zoom images together comprise a multi-layer image set of deep zoom images, each deep zoom image comprising a layer of the multi-layer image set, and the multi-layer image set being characterized by a focus depth that is the distance between the position of the objective lens when capturing the field images from which the uppermost deep zoom image in the plurality of deep zoom images is assembled and the position of the objective lens when capturing the field images from which the lowermost deep zoom image in the plurality of deep zoom images is assembled.

105. The digital microscope system of claim 101, wherein the image selection area further comprises a plurality of distance indications, wherein each distance indication indicates the distance between the objective lens position at which the field images for one of the deep zoom images were captured and a reference objective lens position.

106. The digital microscope system of claim 105, wherein the reference objective lens position is the objective lens position at which the field images from which the center image of the multi-layer image set were captured.

107. The digital microscope system of claim 101, wherein the graphical representations comprise a plurality of vertically arranged symbols, and wherein the position of each symbol within the plurality of vertically arranged symbols indicates the relative position of the microscope objective lens when capturing the field images from which the deep zoom image corresponding to each symbol is assembled.

108. The digital microscope system of claim 107, wherein each symbol comprises one of a bar and a button.

109. The digital microscope system of claim 101, wherein the image selector is selected from a vertical slider bar, and a column of selectable buttons.

110. The digital microscope system of claim 101, wherein each of the graphical representations is selectable, and wherein the image selector comprises the selectable graphical representations.

111. The digital microscope system of claim 102, wherein the image selection indicator is selected from one or more of a color of the graphical representation corresponding to the deep zoom image selected for display, a size of the graphical representation corresponding to the deep zoom image selected for display, and a font type of the graphical representation corresponding to the deep zoom image selected for display.

112. The digital microscope system of claim 101, wherein the image display area further comprises a thumbnail image of the entire deep zoom image selected for display, with a cross-reference indicating the portion of the selected deep zoom image being displayed in the image display area.

113. The digital microscope system of claim 101, wherein the GUI further comprises an animation selector for sequentially displaying two or more selected deep zoom images of the plurality of deep zoom images, wherein each of the two or more selected deep zoom images are displayed for a specified time period.

114. The digital microscope system of claim 113, wherein the specified time period is a time period within the range of 0.1 seconds to 5 seconds.

115. The digital microscope system of claim 113, wherein the specified time period is specified by a microscope user.

The particular embodiments disclosed above are illustrative only, as the invention may be modified and practiced in different but equivalent manners apparent to those skilled in the art having the benefit of the teachings herein. Embodiments of the present invention disclosed and claimed herein may be made and executed without undue experimentation with the benefit of the present disclosure. While the invention has been described in terms of particular embodiments, it will be apparent to those of skill in the art that variations may be applied to systems and apparatus described herein without departing from the concept, spirit and scope of the invention. Examples are all intended to be non-limiting. It is therefore evident that the particular embodiments disclosed above may be altered or modified and all such variations are considered within the scope and spirit of the invention, which are limited only by the scope of the claims.

What is claimed is:

1. A digital microscope system for imaging and displaying at least a portion of a specimen on a microscope slide, comprising:
a slide stage movable along an x-axis and a y-axis to a plurality of stationary slide stage positions each defined by different x, y slide stage coordinates;
a first objective lens movable along a z-axis generally perpendicular to the slide stage to a plurality of objective lens positions each defined by a different z-axis position;
at least one camera optically coupled to the first objective lens, the at least one camera being capable of capturing a Z-stack of field images at each of the plurality of stationary slide stage positions, the Z-stack for each stationary slide stage position comprising a plurality of images each defined by a different z-axis position associated with a different focal plane from each other image in the Z-stack, and the same x, y slide stage coordinates;
a display monitor; and
at least one processor controlling the operations of the digital microscope system, the at least one processor comprising a non-transitory computer-readable medium comprising instructions that when executed by the processor:
cause the at least one camera to capture the Z-stack of field images at each of the plurality of stationary slide stage positions;
assemble a plurality of deep zoom images from the captured images, wherein each deep zoom image:
comprises an image of at least a portion of the slide specimen;
is associated with a different focal plane;
is assembled from a plurality of field images captured by the at least one camera with the first objective lens positioned at the same z-axis position but at different slide stage positions having different x, y slide stage coordinates; and
is characterized by a z-axis position that is different from every other deep zoom image in the plurality of deep zoom images;
cause the display monitor to display a graphical user interface (GUI) comprising:
an image selection area comprising:
a plurality of graphical representations, wherein each graphical representation corresponds to one of the plurality of deep zoom images, and wherein the relative position of each graphical representation among the plurality of graphical representations in the image selection area indicates the relative z-axis position of the field images from which the corresponding deep zoom image is assembled relative to the z-axis position of each of the other deep zoom images in the plurality of deep zoom images;
an image selector for selecting one of the plurality of deep zoom images for display by selecting the graphical representation corresponding to the deep zoom image to be displayed;
an image selection indicator for indicating which of the deep zoom images is selected for display by indicating the graphical representation corresponding to the deep zoom image selected to be displayed; and
an image display area in which at least a portion of the deep zoom image selected for display is displayed simultaneously with the plurality of numerical representations and the image selector.

2. The digital microscope system of claim 1, wherein the plurality of deep zoom images together comprise a multi-layer image set of deep zoom images having at least an uppermost deep zoom image and a lowermost deep zoom image, each deep zoom image comprising a layer of the multi-layer image set, the multi-layer image set being characterized by a focus depth that is the distance between the z-axis position of the first objective lens when capturing the field images from which the uppermost deep zoom image in the plurality of deep zoom images is assembled and the z-axis position of the first objective lens when capturing the field images from which the lowermost deep zoom image in the plurality of deep zoom images is assembled.

3. The digital microscope system of claim 1 further comprising a scale comprising a plurality of distance indications, wherein each distance indication indicates the distance between the z-axis position of the first objective lens associated with one of the deep zoom images and a reference first objective lens z-axis position.

4. The digital microscope system of claim 3, wherein the reference first objective lens z-axis position is the first objective lens z-axis position at which the field images from which the center image of the multi-layer image set were captured.

5. The digital microscope system of claim 1, wherein the plurality of graphical representations comprise a plurality of vertically arranged symbols, and wherein the position of each symbol within the plurality of vertically arranged symbols indicates the relative z-axis position of the first objective lens when capturing the field images from which the deep zoom image corresponding to each symbol is assembled.

6. The digital microscope system of claim 5, wherein each symbol is selected from a bar and a button.

7. The digital microscope system of claim 1, wherein the image selector is selected from a vertical slider bar and a column of selectable buttons.

8. The digital microscope system of claim 1, wherein the image selection indicator is selected from one or more of a color of the graphical representation corresponding to the deep zoom image selected to be displayed, a size of the graphical representation corresponding to the deep zoom image selected to be displayed, and a font type of the graphical representation corresponding to the deep zoom image selected to be displayed.

9. The digital microscope system of claim 1, wherein the image display area further comprises a thumbnail image of the entire deep zoom image selected for display, with a cross-reference indicating the portion of the selected deep zoom image being displayed in the image display area.

10. The digital microscope system of claim 1, wherein the digital microscope system is a fixed image acquisition digital microscope system.

11. The digital microscope system of claim 1, further comprising an animation selector for sequentially displaying two or more selected deep zoom images of the plurality of deep zoom images, wherein each of the two or more selected deep zoom images are displayed sequentially for a specified time period.

12. The digital microscope system of claim 11, wherein the specified time period is a time period within the range of 0.1 seconds to 5 seconds.

13. The digital microscope system of claim 11, wherein the specified time period is specified by a microscope user.

14. A fixed image acquisition digital microscope system for imaging and displaying at least a portion of a specimen on a microscope slide comprising:
a slide stage movable along an x-axis and a y-axis to a plurality of stationary slide stage positions each defined by x, y slide stage coordinates;
a first objective lens movable along a z-axis generally perpendicular to the slide stage to a plurality of objective lens positions each having by a different z-axis position;
a display monitor; and
at least one camera optically coupled to the first objective lens and capable of capturing a Z-stack of field images at each of the plurality of stationary slide stage positions, each Z-stack comprising a plurality of images each captured at 1) a different z-axis position from each other image in the Z-stack, and 2) the same x, y slide stage coordinates;
at least one processor controlling the operations of the digital microscope system, the at least one processor comprising a non-transitory computer-readable medium comprising instructions that when executed by the processor:
cause the at least one camera to capture the Z-stack of field images at each of the plurality of stationary slide stage positions;
assemble a plurality of deep zoom images from the captured images, wherein each deep zoom image:
comprises an image of at least a portion of the slide specimen;
is assembled from a plurality of field images captured by the camera with the first objective lens positioned at the same z-axis position but at different slide stage positions having different x, y slide stage coordinates; and
is characterized by a z-axis position that is different from every other deep zoom image in the plurality of deep zoom images, wherein each z-axis position is associated with a focal plane of the first objective lens;
cause the cause the display monitor to display a graphical user interface (GUI) comprising:
an image selection area comprising:
a plurality of graphical representations, each graphical representation corresponding to one of the plurality of deep zoom images, wherein the relative position of each graphical representation among the plurality of graphical representations in the image selection area indicates the relative z-axis position of the field images from which the corresponding deep zoom image is assembled relative to the z-axis position of each of the other deep zoom images in the plurality of deep zoom images;
an image selector for selecting one of the plurality of deep zoom images for display; and
an image display area in which at least a portion of the deep zoom image selected for display is displayed simultaneously with the plurality of graphical representations and the image selector.

15. The digital microscope system of claim 14, further comprising an image selection indicator for indicating which of the deep zoom images has been selected for display.

16. The digital microscope system of claim 14, wherein the image selection indicator indicates which of the deep zoom images is selected for display by highlighting the graphical representation corresponding to the deep zoom image selected for display.

17. A digital microscope system for imaging and displaying at least a portion of a specimen on a microscope slide, comprising:
a slide stage movable along an x-axis and a y-axis to a plurality of different stationary slide stage positions each defined by different x, y slide stage coordinates;
a first objective lens movable along a z-axis generally perpendicular to the slide stage to a plurality of objective lens positions each having a different z-axis position;
a polarizer and a polarizer analyzer positionable at a plurality of polarity angles relative to one another;
at least one camera optically coupled to the first objective lens, the at least one camera being capable of capturing a first plurality of field images at each of a second plurality of stationary slide stage positions, each field image in the first plurality of field images being defined by a different polarity angle between the polarizer and polarizer analyzer from each other field image in the first plurality of field images, and the same x, y slide stage coordinates;

a display monitor; and at least one processor controlling the operations of the digital microscope system, the at least one processor comprising a non-transitory computer-readable medium comprising instructions that when executed by the processor:

cause the at least one camera to capture the first plurality of field images at each of the second plurality of stationary slide stage positions;

assemble a plurality of polarized deep zoom images from the captured images, wherein each polarized deep zoom image:

comprises an image of at least a portion of the slide specimen;

is assembled from a plurality of field images captured by the at least one camera with the polarizer and polarizer analyzer positioned at the same polarity angle but at different slide stage positions having different x, y slide stage coordinates; and is characterized by a polarity angle that is different from every other polarized deep zoom image in the plurality of polarized deep zoom images;

cause the display monitor to provide a graphical user interface (GUI) comprising:

an image selection area comprising:

a plurality of graphical representations, wherein each graphical representation corresponds to one of the plurality of polarized deep zoom images, and indicates the polarity angle of the field images from which the corresponding polarized deep zoom image is assembled;

an image selector for selecting one of the plurality of polarized deep zoom images for display; and an image display area in which at least a portion of the polarized deep zoom image selected for display is displayed simultaneously with the plurality of graphical representations and the image selector.

18. The digital microscope system of claim 17, further comprising an image selection indicator for indicating which of the polarized deep zoom images is selected for display.

19. The digital microscope system of claim 17, wherein the image selection indicator indicates which of the polarized deep zoom images is selected for display by highlighting the graphical representation corresponding to the deep zoom image selected for display.

20. The digital microscope system of claim 17, wherein each of the plurality of graphical representations also includes a numerical indication of the polarity angle of the corresponding deep zoom image.

* * * * *